(12) United States Patent
Peng et al.

(10) Patent No.: US 11,017,761 B2
(45) Date of Patent: May 25, 2021

(54) PARALLEL NEURAL TEXT-TO-SPEECH

(71) Applicant: Baidu USA, LLC, Sunnyvale, CA (US)

(72) Inventors: Kainan Peng, Sunnyvale, CA (US); Wei Ping, Sunnyvale, CA (US); Zhao Song, Sunnyvale, CA (US); Kexin Zhao, Santa Clara, CA (US)

(73) Assignee: Baidu USA LLC, Sunnyvale, CA (US)

(*) Notice: Subject to any disclaimer, the term of this patent is extended or adjusted under 35 U.S.C. 154(b) by 21 days.

(21) Appl. No.: 16/654,955

(22) Filed: Oct. 16, 2019

(65) Prior Publication Data

US 2020/0066253 A1  Feb. 27, 2020

Related U.S. Application Data

(63) Continuation-in-part of application No. 16/277,919, filed on Feb. 15, 2019, now Pat. No. 10,872,596, which is a continuation-in-part of application No. 16/058,265, filed on Aug. 8, 2018, now Pat. No. 10,796,686.

(Continued)

(51) Int. Cl.
| | |
|---|---|
| *G10L 13/00* | (2006.01) |
| *G10L 13/08* | (2013.01) |
| *G06F 9/30* | (2018.01) |
| *G10L 13/047* | (2013.01) |
| *G06F 17/18* | (2006.01) |

(Continued)

(52) U.S. Cl.
CPC ............ *G10L 13/047* (2013.01); *G06F 17/18* (2013.01); *G10L 19/00* (2013.01); *G10L 25/30* (2013.01)

(58) Field of Classification Search
CPC ..... G10L 13/027; G10L 13/08; G10L 13/047; G10L 13/00; G06F 9/30003
See application file for complete search history.

(56) References Cited

U.S. PATENT DOCUMENTS

| | | |
|---|---|---|
| 5,970,453 A | 10/1999 | Sharman |
| 6,078,885 A | 6/2000 | Beutnagel |

(Continued)

OTHER PUBLICATIONS

Aaron et al. Nov. 28, 2017, Parallel WaveNet: Fast High-Fidelity Speech Synthesis, 2017 (Year: 2017).*

(Continued)

*Primary Examiner* — Mohammad K Islam
(74) *Attorney, Agent, or Firm* — North Weber & Baugh LLP

(57) ABSTRACT

Presented herein are embodiments of a non-autoregressive sequence-to-sequence model that converts text to an audio representation. Embodiment are fully convolutional, and a tested embodiment obtained about 46.7 times speed-up over a prior model at synthesis while maintaining comparable speech quality using a WaveNet vocoder. Interestingly, a tested embodiment also has fewer attention errors than the autoregressive model on challenging test sentences. In one or more embodiments, the first fully parallel neural text-to-speech system was built by applying the inverse autoregressive flow (IAF) as the parallel neural vocoder. System embodiments can synthesize speech from text through a single feed-forward pass. Also disclosed herein are embodiments of a novel approach to train the IAF from scratch as a generative model for raw waveform, which avoids the need for distillation from a separately trained WaveNet.

20 Claims, 13 Drawing Sheets

Related U.S. Application Data

(60) Provisional application No. 62/574,382, filed on Oct. 19, 2017.

(51) Int. Cl.
*G10L 25/30* (2013.01)
*G10L 19/00* (2013.01)

(56) References Cited

U.S. PATENT DOCUMENTS

| | | | |
|---|---|---|---|
| 8,898,062 | B2 | 11/2014 | Kato |
| 9,508,341 | B1 | 11/2016 | Parlikar |
| 10,134,388 | B1 | 11/2018 | Lilly |
| 10,319,364 | B2 | 6/2019 | Reber |
| 2001/0012999 | A1 | 8/2001 | Vitale |
| 2002/0026315 | A1* | 2/2002 | Miranda ............ G10L 13/04 704/258 |
| 2003/0212555 | A1 | 11/2003 | van Santen |
| 2004/0039570 | A1 | 2/2004 | Harengel |
| 2004/0193398 | A1 | 9/2004 | Chu |
| 2005/0033575 | A1 | 2/2005 | Schneider |
| 2005/0119890 | A1 | 6/2005 | Hirose |
| 2005/0137870 | A1 | 6/2005 | Mizutani |
| 2005/0182629 | A1 | 8/2005 | Coorman |
| 2005/0192807 | A1 | 9/2005 | Emam |
| 2006/0149543 | A1 | 7/2006 | Lassalle |
| 2007/0005337 | A1 | 1/2007 | Mount |
| 2007/0094030 | A1 | 4/2007 | Xu |
| 2007/0118377 | A1 | 5/2007 | Badino |
| 2007/0168189 | A1 | 7/2007 | Tamura |
| 2008/0114598 | A1 | 5/2008 | Prieto |
| 2008/0167862 | A1 | 7/2008 | Mohajer |
| 2009/0157383 | A1 | 6/2009 | Cho |
| 2010/0004934 | A1* | 1/2010 | Hirose ............ G10L 21/02 704/261 |
| 2010/0312562 | A1 | 12/2010 | Wang |
| 2011/0087488 | A1 | 4/2011 | Morinaka |
| 2011/0202355 | A1* | 8/2011 | Grill ............ G10L 19/18 704/500 |
| 2012/0035933 | A1 | 2/2012 | Con Kie |
| 2012/0143611 | A1 | 6/2012 | Qian |
| 2012/0265533 | A1 | 10/2012 | Honeycutt |
| 2013/0325477 | A1 | 12/2013 | Mitsui |
| 2014/0046662 | A1 | 2/2014 | Tyagi |
| 2015/0243275 | A1 | 8/2015 | Luan |
| 2015/0279358 | A1 | 10/2015 | Kingsbury |
| 2016/0078859 | A1 | 3/2016 | Luan |
| 2017/0148433 | A1 | 5/2017 | Catanzaro |
| 2019/0122651 | A1* | 4/2019 | Arik et al. ............ G10L 13/08 |

OTHER PUBLICATIONS

Ribeiro et al.,"CrowdMOS: An approach for crowdsourcing mean opinion score studies," In ICASSP, 2011. (4pgs).
Shen et al.,"Natural TTS synthesis by conditioning WaveNet on mel spectrogram predictions," In ICASSP, 2018. (5pgs).
Sotelo et al.,"Char2wav:End-to-end speech synthesis," ICLR workshop, 2017. (6pgs).
Taigman et al.,"VoiceLoop: Voice fitting and synthesis via a phonological loop," In ICLR, 2018. (14pgs).
P. Taylor"Text-to-Speech Synthesis," Cambridge University Press, 2009. (17pgs).
Van den Oord et al.,"WaveNet: A generative model for raw audio," arXiv preprint arXiv:1609.03499, 2016. (15pgs).
Van den Oord et al.,"Neural discrete representation learning," arXiv preprint arXiv:1711.00937, 2018. (11pgs).
Van den Oord et al.,"Parallel WaveNet: Fast high-fidelity speech synthesis," arXiv preprint arXiv:1711.10433, 2017. (11 pgs).
Wang et al.,"Neural source-filter-based waveform model for statistical parametric speech synthesis," arXiv preprint arXiv:1904.12088, 2019. (14pgs).

Wang et al.,"Tacotron: Towards end-to-end speech synthesis," arXiv preprint arXiv:1703.10135, 2017. (10pgs).
Yamagishi et al., "Robust Speaker-Adaptive HMM-Based Text-to-Speech Synthesis," In IEEE Transactions on Audio, and Language Processing, 2009. (23pgs).
Yamagishi et al., "Thousands of Voices for HMM-Based Speech Synthesis-Analysis and Application of TTS Systems Built on Various ASR Corpora", In IEEE Transactions on Audio, Speech, and Language Processing, 2010. (21 pgs).
Yamagishi et al.,"Robust Speaker-Adaptive HMM-Based Text-to-Speech Synthesis," IEEE Transactions on Audio, Speech, and Language Processing, vol. 17, No. 6, Aug. 2009, [online], [Retrieved Jul. 8, 2018]. Retrieved from Internet <URL: <https://www.researchgate.net/publication/224558048> (24 pgs).
2015 IEEE International Conference, 2015.(5 pgs).
Ribeiro et al.,"Crowdmos: An approach for crowdsourcing mean opinion score studies," In Acoustics, Speech & Signal Processing (ICASSP) IEEE Intr Conference, 2011. (4 pgs).
Ronanki et al.,"A template-based approach for speech synthesis intonation generation using LSTMs," Interspeech 2016, pp. 2463-2467, 2016. (5pgs).
Sotelo et al.,"Char2wav: End-to-End speech synthesis," Retrieved from Internet <URL:<https://openreview.net/pdf?id=B1VWyySKx>, 2017. (6pgs).
Stephenson et al.,"Production Rendering, Design and Implementation," Springer, 2005. (5pgs).
Taylor et al.,"Text-to-Speech Synthesis," Cambridge University Press, New York, NY, USA, 1st edition, 2009. ISBN 0521899273, 9780521899277. (17 pgs).
Theis et al.,"A note on the evaluation of generative models," arXiv preprint arXiv:1511.01844, 2015. (9 pgs).
Oord et al.,"Wavenet: A generative model for raw audio," arXiv preprint arXiv:1609.03499, 2016. (15 pgs).
Weide et al.,"The CMU pronunciation dictionary," Retrieved from Internet <URL: <http://www.speech.cs.cmu.edu/cgi-bin/cmudict>, 2008. (2pgs).
Yao et al.,"Sequence-to-sequence neural net models for grapheme-to-phoneme conversion," arXiv preprint arXiv:1506.00196, 2015. (5 pgs).
Notice of Allowance and Fee Due dated Aug. 26, 2020, in related U.S. Appl. No. 15/882,926. (6 pgs).
Corrected Notice of Allowance and Fee Due dated Oct. 6, 2020, in related U.S. Appl. No. 15/974,397. (4 pgs).
Notice of Allowance and Fee Due dated Oct. 2, 2020, in related U.S. Appl. No. 15/974,397. (10 pgs).
Response to Final Office Ation filed Sep. 24, 2020, in related U.S. Appl. No. 15/974,397. (12 pgs).
Response to Final Office Ation filed Aug. 23, 2020, in related U.S. Appl. No. 15/974,397. (15 pgs).
Response to Final Office Ation filed Aug. 17, 2020, in related U.S. Appl. No. 15/882,926. (10 pgs).
Non-Final Office Action dated Feb. 7, 2020, in U.S. Appl. No. 15/974,397 (10 pgs).
Response filed May 7, 2020, in U.S. Appl. No. 15/974,397 (15 pgs).
Notice of Allowance and Fee Due dated May 8, 2020, in related U.S. Appl. No. 16/058,265. (9 pgs).
Arik et al., "Deep Voice: Real-time neural text-to-speech," arXiv preprint arXiv:arXiv:1702.07825,2017. (17pgs).
Arik et al., "Deep Voice 2: Multi-speaker neural text-to-speech," arXiv preprint arXiv:1705.08947, 2017. (15pgs).
Arik et al.,"Neural voice cloning with a few samples," arXiv preprint arXiv:1802.06006, 2018. (18pgs).
Arik et al.,"Fast spectrogram inversion using multi-head convolutional neural networks," arXiv preprint arXiv:1808.06719, 2018. (6pgs).
Bandanau et al.,"Neural machine translation by jointly learning to align and translate," arXiv preprint arXiv:1409.0473, 2016. (15 pgs).
Bengio et al.,"Scheduled sampling for sequence prediction with recurrent neural networks," arXiv preprint arXiv:1506.03099, 2015. (9pgs).

(56) References Cited

OTHER PUBLICATIONS

Bowman et al.,"Generating sentences from a continuous space," In Proceedings of The 20th SIGNLL Conference on Computational Natural Language Learning, 2016. (12pgs).
Chen et al.,"Sample efficient adaptive text-to-speech," arXiv preprint arXiv:1809.10460, 2019. (16pgs).
Chung et al.,"A recurrent latent variable model for sequential data," arXiv preprint arXiv:1506.02216, 2016. (9pgs).
Denton et al.,"Stochastic video generation with a learned prior," arXiv preprint arXiv:1802.07687, 2018. (12pgs).
Wu et al.,"A study of speaker adaptation for DNN-based speech synthesis," In Interspeech, 2015. (5 pgs).
Yamagishi et al.,"Robust speaker-adaptive HMM-based text-to-speech synthesis," IEEE Transactions on Audio, Speech, and Language Processing, 2009. (23 pgs).
Yang et al.,"On the training of DNN-based average voice model for speech synthesis," In Signal & Info. Processing Association Annual Summit & Conference (APSIPA), Retrieved from Internet <URL: <http://www.nwpu-aslp.org/lxie/papers/2016APSIPA-YS.pdf>, 2016. (6 pgs).
Zen et al.,"Unidirectional long short-term memory recurrent neural network with recurrent output layer for low-latency speech synthesis," In IEEE ICASSP, 2015. (5 pgs).
Zen et al.,"Fast, Compact, and High quality LSTM-RNN based statistical parametric speech synthesizers for mobile devices," arXiv:1606.06061, 2016. (14 pgs).
Abadi et al.,"TensorFlow: Large-scale machine learning on heterogeneous systems," Retrieved from Internet <URL: http://download.tensorflow.org/paper/whitepaper2015.pdf>, 2015. (19pgs).
Amodei et al.,"Deep speech 2: End-to-End speech recognition in English and Mandarin," arXiv preprint arXiv:1512.02595, 2015. (28pgs).
Boersma et al.,"PRAAT, a system for doing phonetics by computer," Glot international, vol. 5, No. 9/10, Nov./Dec. 2001 (341-347). (7pgs).
Bradbury et al.,"Quasi-recurrent neural networks," arXiv preprint arXiv:1611.01576, 2016. (11pgs).
Chung et al.,"Empirical evaluation of gated recurrent neural networks on sequence modeling," arXiv preprint arXiv:1412.3555, 2014. (9 pgs).
Diamos et al.,"Persistent RNNS: Stashing recurrent weights On-Chip," In Proceedings of The 33rd International Conference on Machine Learning, 2016. (10pgs).
Dukhan et al.,"PeachPy meets Opcodes: direct machine code generation from Python," In Proceedings of the 5th Workshop on Python for High-Performance and Scientific Computing, 2015. (2 pgs).
Graves et al.,"Connectionist temporal classification:Labelling unsegmented sequence data with recurrent neural networks," In Proceedings of the 23rd International Conference.
Zen et al,"Unidirectional long short-term memory recurrent neural network with recurrent output layer for low-latency speech synthesis," Retrieved from Internet <URL: <https://static.googleusercontent.com/media/research.google.com/en//pubs/archive/43266.pdf>, 2015. (5pgs).
Zen et al.,"Statistical parametric speech synthesis using deep neural networks," Retrieved from Internet <URL: <https://static.googleusercontent.com/media/research.google.com/en//pubs/archive/40837.pdf>, 2013. (5pgs).
Retrieved from Internet <URL.
Lample et al.,"Neural architectures for named entity recognition," arXiv preprint arXiv:1603.01360, 2016. (10 pgs).
Li et al.,"Deep speaker: an End-to-End neural speaker embedding system," arXiv preprint arXiv:1705.02304, 2017. (8 pgs).
Mehri et al.,"SampleRNN: An unconditional End-to-End neural audio generation model," arXiv preprint arXiv:1612.07837, 2016. (11 pgs).
Reynolds et al.,"Speaker verification using adapted gaussian mixture models," Digital signal processing, 10(1-3):19-41, 2000. (23 pgs).
Ribeiro et al.,"Crowdmos: An approach for crowdsourcing mean opinion score studies," In IEEE ICASSP, 2011. (4 pgs).
Ronanki et al.,"Median-based generation of synthetic speech durations using a non-parametric approach," arXiv preprint arXiv:1608.06134, 2016. (7 pgs).
Salimans et al.,"Improved techniques for training GANs," In NIPS, 2016. (9 pgs).
Sotelo et al.,"CHAR2WAV: End-to-End speech synthesis," In ICLR2017 workshop submission, 2017. (6pgs).
Wang et al.,"Tacotron: Towards end-to-end speech synthesis," In Interspeech, 2017. (3 pgs).
Notice of Allowance and Fee Due dated Feb. 27, 2020, in related U.S. Appl. No. 16/058,265. (9 pgs).
Dinh et al.,"NICE: Non-linear independent components estimation," arXiv preprint arXiv:1410.8516, 2015. (13pgs).
Dinh et al.,"Density estimation using real NVP," In ICLR, 2017. (32pgs).
Gehring et al.,"Convolutional sequence to sequence learning," In ICML, 2017. (15pgs).
Griffin et al.,"Signal estimation from modified short-time fourier transform," IEEE Transactions on Acoustics, Speech, and Signal Processing, 1984. (8pgs).
Gu et al.,"Non-autoregressive neural machine translation," In ICLR, 2018. (13pgs).
Hsu et al.,"Hierarchical generative modeling for controllable speech synthesis," In ICLR, 2019. (27pgs).
Jia et al.,"Transfer learning from speaker verification to multispeaker text-to-speech synthesis," arXiv preprint arXiv:1806.04558, 2019. (15pgs).
Kaiser et al.,"Fast decoding in sequence models using discrete latent variables," arXiv preprint arXiv:1803.03382, 2018. (10pgs).
Kalchbrenner et al.,"Efficient neural audio synthesis," arXiv preprint arXiv:1802.08435, 2018. (10pgs).
Kim et al.,"FloWaveNet: A generative flow for raw audio," arXiv preprint arXiv:1811.02155, 2019. (9pgs).
Abdel-Hamid et al.,"Fast speaker adaptation of hybrid NN/HMM model for speech recognition based on discriminative learning of speaker code," In ICASSP, 2013. (5pgs).
Arik et al.,"Deep Voice: Real-time neural text-to-speech," arXiv preprint arXiv:1702.07825, 2017. (17 pgs).
Bradbury et al.,"Quasi-Recurrent Neural Networks," In ICLR, 2017. (12pgs).
Cho et al.,"Learning Phrase Representations using RNN Encoder-Decoder for statistical machine translation," arXiv:1406.1078, 2014. (14 pgs).
Fan et al.,"Multi-speaker modeling and speaker adaptation for DNN-based TTS synthesis," In IEEE ICASSP, 2015. (2 pgs).
Graves et al.,"Connectionist temporal classification: labelling unsegmented sequence data with recurrent neural networks," In Proceedings of the 23rd International Conference on Machine Learning (ICML), 2006. (8 pgs).
Hsu et al.,"Voice conversion from unaligned corpora using variational autoencoding wasserstein generative adversarial networks," arXiv:1704.00849, 2017. (5 pgs).
Ioffe et al.,"Batch normalization: Accelerating deep network training by reducing internal covariate shift," arXiv preprint arXiv:1502.03167, 2015. (10 pgs).
Kingma et al.,"ADAM: A method for stochastic optimization," arXiv preprint arXiv:1412.6980, 2014. (9 pgs).
On Machine Learning, ICML, USA, 2006. (8 pgs).
Morise et al.,"WORLD: a vocoder-based high-quality speech synthesis system for real-time applications," IEICE Transactions on Information and Systems, 2016. (8 pgs).
Oord et al.,"Pixel recurrent neural networks," arXiv preprint arXiv:1601.06759, 2016. (10 pgs).
Paine et al.,"Fast wavenet generation algorithm," arXiv preprint arXiv:1611.09482, 2016. (6 pgs).
Pascual et al.,"Multi-output RNN-LSTM for multiple speaker speech synthesis with interpolation model," 9th ISCA Speech Synthesis Workshop, 2016. (6 pgs).
Prahallad et al.,"The blizzard challenge 2013—Indian language task," Retrieved from Internet <URL: <http://festvox.org/blizzard/bc2013/blizzard_2013_summary_indian.pdf>, 2013. (11pgs).

(56) References Cited

OTHER PUBLICATIONS

Rao et al.,"Grapheme-to-phoneme conversion using long short-term memory recurrent neural networks," In Acoustics, Speech and Signal Processing (ICASSP).
Divay et al., "Algorithms for Grapheme-Phoneme Translation for English and French: Applications for Database Searches and Speech Synthesis," Association for Computational Linguistics,1997. (29 pgs).
Non-Final Office Action dated Aug. 30, 2019, in U.S. Appl. No. 15/882,926 (8 pgs).
Response filed Nov. 26, 2019, in U.S. Appl. No. 15/882,926 (11 pgs).
Non-Final Office Action dated Feb. 3, 2020, in U.S. Appl. No. 15/882,926 (10 pgs).
Response filed May 4, 2020, in U.S. Appl. No. 15/882,926 (11pgs).
Kingma et al.,"Glow: Generative flow with invertible 1x1 convolutions," arXiv preprint arXiv:1807.03039, 2018. (15pgs).
Kingma et al.,"Auto-encoding variational Bayes," arXiv preprint arXiv:1312.6114, 2014. (14pgs).
Kingma et al.,"Improving variational inference with inverse autoregressive flow," In NIPS, 2016. (16pgs).
Lee et al.,"Deterministic non-autoregressive neural sequence modeling by iterative refinemen," arXiv preprint arXiv:1802.06901, 2018. (11 pgs).
Nachmani et al.,"Fitting new speakers based on a short untranscribed sample," arXiv preprint arXiv:1802.06984, 2018. (9pgs).
Ping et al.,"ClariNet: Parallel wave generation in end-to-end text-to-speech," arXiv preprint arXiv:1807.07281, 2019. (15pgs).
Prenger et al.,"WaveGlow: A flow-based generative network for speech synthesis," [online], [Retrieved Mar. 3, 2020]. Retrieved from Internet <URL: https://ieeexplore.ieee.org/abstract/document/8683143>In ICASSP, 2019. (2pgs).
Rezende et al.,"Variational inference with normalizing flows," arXiv preprint arXiv:1505.05770, 2016. (10pgs).
Rezende et al.,"Stochastic backpropagation and approximate inference in deep generative models," arXiv preprint arXiv:1401.4082, 2014. (14pgs).
Y. Agiomyrgiannakis,"Vocaine the vocoder and applications in speech synthesis," In ICASSP, 2015. (5 pgs).
Arik et al.,"Deep Voice: Real-time neural text-to-speech," arXiv preprint arXiv:1702.07825v2, 2017. (17 pgs).
Arik et al.,"Deep Voice 2: Multi-speaker neural text-to-speech," arXiv preprint arXiv:1705.08947v1, 2017. (15 pgs).
C. Bagwell,"SoX—Sound eXchange," [online], [Retrieved Jul. 22, 2019]. Retrieved from Internet <URL:https://sourceforge.net/p/sox/code/ci/master/tree/> (3 pgs).
Bahdanau et al.,"Neural machine translation by jointly learning to align and translate," arXiv preprint arXiv:1409.0473v1, 2014. (15pgs).
Capes et al.,"Siri On-Device Deep Learning-Guided Unit Selection Text-to-Speech System," In Interspeech, 2017. (5pgs).
Cho et al.,"Learning phrase representations using RNN encoder-decoder for statistical machine translation," In EMNLP, 2014. (11pgs).
Chorowski et al., "Attention-based models for speech recognition," In NIPS, 2015. (9pgs).
Dauphin et al.,"Language modeling with gated convolutional networks," arXiv preprint arXiv:1612.08083v1, 2016. (8pgs).
Gehring et al.,"Convolutional sequence to sequence learning," arXiv preprint arXiv:1705.03122v1, 2017. (15 pgs).
Kim et al.,"Sequence-level knowledge distillation," In EMNLP, 2016. (11pgs).
Kingma et al.,"ADAM: A method for stochastic optimization," In ICLR, 2015. (15 pgs).
Kingma et al.,"Auto-Encoding variational Bayes," In ICLR, 2014. (14 pgs).
Kingma et al.,"Improving variational inference with inverse autoregressive flow," In NIPS, 2016. (9 pgs).
Lee et al.,"Deterministic non-autoregressive neural sequence modeling by iterative refinement," arXiv preprint arXiv:1802.06901, 2018. (11 pgs).
Mehri et al.,"SampleRNN:An unconditional end-to-end neural audio generation model," In ICLR, 2017. (11pgs).
Morise et al.,"WORLD: a vocoder-based high-quality speech synthesis system for real-time applications," IEICE Transactions on Information & Systems, 2016. (8 pgs).
K. Murphy,"Machine learning, A probabilistic perspective," 2012, [online], [Retrieved Sep. 3, 2019]. Retrieved from Internet <URL: <https://doc.lagout.org/science/Artificial%20Intelligence/Machine%20learning/Machine%20Learning_%20A%20Probabilistic%20Perspective%20%5BMurphy%202012-08-24%5D.pdf> (24 pgs).
Arik et al.,"Deep Voice: Real-time neural text-to-speech," In ICML, 2017. (17pgs).
Arik et al.,"Deep Voice 2: Multi-speaker neural text-to-speech," In NIPS, 2017. (15 pgs).
Bahdanau et al.,"Neural machine translation by jointly learning to align and translate," In ICLR, 2015. (15 pgs).
Bucilua et al.,"Model Compression," In ACM SIGKDD, 2006. (7 pgs).
Chung et al.,"A recurrent latent variable model for sequential data," In NIPS, 2015. (9pgs).
Hinton et al.,"Distilling the knowledge in a neural network," arXiv preprint arXiv:1503.02531, 2015. (9 pgs).
Notice of Allowance and Fee Due dated Aug. 11, 2020, in related U.S. Appl. No. 16/277,919. (10 pgs).
Van den Oord et al.,"Parallel WaveNet: Fast high-fidelity speech synthesis," In ICML, 2018. (9pgs).
Rush et al.,"A neural attention model for abstractive sentence summarization," In EMNLP, 2015. (11 pgs).
Salimans et al.,"Weight normalization: A simple reparameterization to accelerate training of deep neural networks," In NIPS, arXiv:1602.07868v3, 2016. (11 pgs).
Sotelo et al.,"Char2wav: End-to-end speech synthesis," In ICLR workshop, 2017. (6 pgs).
Sutskever et al., "Sequence to Sequence Learning with Neural Networks", In NIPS, 2014. (9 pgs).
Taigman et al., "Voiceloop: Voicefitting andsynthesis via Aphonological-loop", arXiv preprint arXiv:1707.06588, 2017. (12pgs).
Paul Taylor,"Text-to-Speech Synthesis," [online], [Retrieved Aug. 1, 2019]. Retrieved from Internet <URL: <http://citeseerx.ist.psu.edu/viewdoc/download?doi=10.1.1.118.5905&rep=rep1&type=pdf> Cambridge University Press, 2009 (22 pgs).
Vaswani et al., "Attention Is All You Need", arXiv preprint arXiv:1706.03762, 2017.(15 pgs).
Wang et al.,"Tacotron:Towards End-to-End speech synthesis", In Interspeech, 2017.(5 pgs).
Gonzalvo et al.,"Recent advances in Google real-time HMM-driven unit selection synthesizer," In Interspeech, 2016. (5 pgs).
Kawahara et al.,"Restructuring speech representations using a pitch-adaptive time—Frequency smoothing and an instantaneous-frequency-based F0 extraction: Possible role of a repetitive structure in sounds," Speech communication, 1999. (21pgs).
Ochshorn et al., "Gentle," Retrieved from Internet <URL: https://github.com/lowerquality/gentle> 2017. (2 pgs).
Van den Oord et al.,"WaveNet: A generative model for raw audio," arXiv:1609.03499, 2016. (15 pgs).
Panayotov et al.,"Librispeech: an ASR corpus based on public domain audio books," In Acoustics, Speech and Signal Processing (ICASSP), 2015 IEEE. (5 pgs).
Raffel et al.,"Online and linear-time attention by enforcing monotonic alignments," arXiv preprint arXiv:1704.00784v1, 2017. (19 pgs).
Ping et al,"Deep Voice 3: Scaling text-to-speech with convolutional sequence learning," arXiv preprint arXiv:1710.07654, 2018. (16pgs).
Peng et al.,"Parallel Neural Text-to-Speech," arXiv preprint arXiv:1905.08459, 2019. (14pgs).
Final Office Ation dated Jun. 15, 2020, in related U.S. Appl. No. 15/882,926. (10 pgs).
Final Office Ation dated Jun. 24, 2020, in related U.S. Appl. No. 15/974,397. (11 pgs).
Odena et al.,"Deconvolution and checkerboard artifacts," 2016, [Retrieved Sep. 3, 2019]. Retrieved from Internet <URL:<https://distill.pub/2016/deconv-checkerboard/>.(10pgs).
Pascanu et al.,"On the difficulty of training recurrent neural networks," In ICML, 2013. (9pgs).

(56) References Cited

OTHER PUBLICATIONS

Ping et al.,"Deep Voice 3: Scaling text-to-speech with convolutional sequence learning," In ICLR, 2018. (16pgs).

Rezende et al.,"Variational inference with normalizing flows," In ICML, 2015. (10 pgs).

Roy et al,"Theory and experiments on vector quantized autoencoders," arXiv preprint arXiv:1805.11063, 2018. (11pgs).

Salimans et al.,"PixelCNN++: Improving the PixelCNN with discretized logistic mixture likelihood and other modifications," In ICLR, 2017. (10pgs).

P. Taylor,"Text-to-Speech Synthesis," Cambridge University Press, 2009. [online], [Retrieved Sep. 3, 2019]. Retrieved from Internet <URL: <http://citeseerx.ist.psu.edu/viewdoc/download?doi=10.1.1.118.5905&rep=rep1&type=pdf>. (19 pgs).

Uria et al.,"RNADE: The real-valued neural autoregressive density-estimator," In Advances in Neural Information Processing Systems, pp. 2175-2183, 2013. (10pgs).

A.van den Oord et al.,"WaveNet: A generative model for raw audio," arXiv preprint arXiv:1609.03499, 2016. (15pgs).

A.van den Oord et al.,"Conditional image generation with PixelCNN decoders," In NIPS, 2016. (9pgs).

A.van den Oord et al.,"Parallel WaveNet: Fast high-fidelity speech synthesis," In ICML, 2018. (9pgs).

R. Yamamoto,"WaveNet vocoder," 2018 [online], [Retrieved Sep. 4, 2019]. Retrieved from Internet <URL: <https://github.com/r9y9/wavenet_vocoder>. (6pgs).

Zhao et al.,"Wasserstein GAN & Waveform Loss-based acoustic model training for multi-speaker text-to-speech synthesis systems using a WaveNet vocoder," IEEE Access,2018.(10pgs).

Gehring,"Convolutional sequence to sequence learing," In ICML, 2017. (10 pgs).

Ping et al.,"ClariNet: ParallelWave Generation in End-to-End Text-to-Speech," arXiv preprint arXiv:1807.07281, 2018. (12 pgs).

\* cited by examiner

1200

Encode the input text into hidden representations comprising a set of key representations and a set of value representations using the encoder, which comprises one or more convolution layers —— 1205

Decode the hidden representations using a non-autoregressive decoder to obtain a set of decoder block outputs —— 1210

Use the set of decoder block outputs to generate a set of audio representation frames representing the input text —— 1215

FIG. 12

PARALLEL NEURAL TEXT-TO-SPEECH

CROSS-REFERENCE TO RELATED APPLICATION

The present application is a continuation-in-part application of and claims priority benefit of commonly-owned to U.S. patent application Ser. No. 16/277,919, filed on Feb. 15, 2019, entitled "SYSTEMS AND METHODS FOR PARALLEL WAVE GENERATION IN END-TO-END TEXT-TO-SPEECH," listing Wei Ping, Kainan Peng, and Jitong Chen as inventors, which is a continuation-in-part application of and claims priority benefit of commonly-owned to U.S. patent application Ser. No. 16/058,265, filed on Aug. 8, 2018, entitled "SYSTEMS AND METHODS FOR NEURAL TEXT-TO-SPEECH USING CONVOLUTIONAL SEQUENCE LEARNING," listing Sercan Arik, Wei Ping, Kainan Peng, Sharan Narang, Ajay Kannan, Andrew Gibiansky, Jonathan Raiman, and John Miller as inventors, which claimed priority under 35 U.S.C. § 119(e) to U.S. Provisional Application No. 62/574,382, filed on Oct. 19, 2017, entitled "SYSTEMS AND METHODS FOR NEURAL TEXT-TO-SPEECH USING CONVOLUTIONAL SEQUENCE LEARNING," listing Sercan Arik, Wei Ping, Kainan Peng, Sharan Narang, Ajay Kannan, Andrew Gibiansky, Jonathan Raiman, and John Miller as inventors. Each patent document is incorporated in its entirety herein by reference and for all purposes.

BACKGROUND

A. Technical Field

The present disclosure relates generally to systems and methods for computer learning that can provide improved computer performance, features, and uses. More particularly, the present disclosure relates to systems and methods for text-to-speech through deep neutral networks.

B. Background

Artificial speech synthesis systems, commonly known as text-to-speech (TTS) systems, convert written language into human speech. TTS systems are used in a variety of applications, such as human-technology interfaces, accessibility for the visually-impaired, media, and entertainment. Fundamentally, it allows human-technology interaction without requiring visual interfaces. Traditional TTS systems are based on complex multi-stage hand-engineered pipelines. Typically, these systems first transform text into a compact audio representation, and then convert this representation into audio using an audio waveform synthesis method called a vocoder.

Due to their complexity, developing TTS systems can be very labor intensive and difficult. Recent work on neural TTS has demonstrated impressive results, yielding pipelines with somewhat simpler features, fewer components, and higher quality synthesized speech. There is not yet a consensus on the optimal neural network architecture for TTS.

Accordingly, what is needed are systems and methods for creating, developing, and/or deploying improved speaker text-to-speech systems.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 12 depicts a general method for using a ParaNet embodiment for synthesizing a speech representation from input text, according to embodiments of the present disclosure.

DETAILED DESCRIPTION OF EMBODIMENTS

Figure 1:
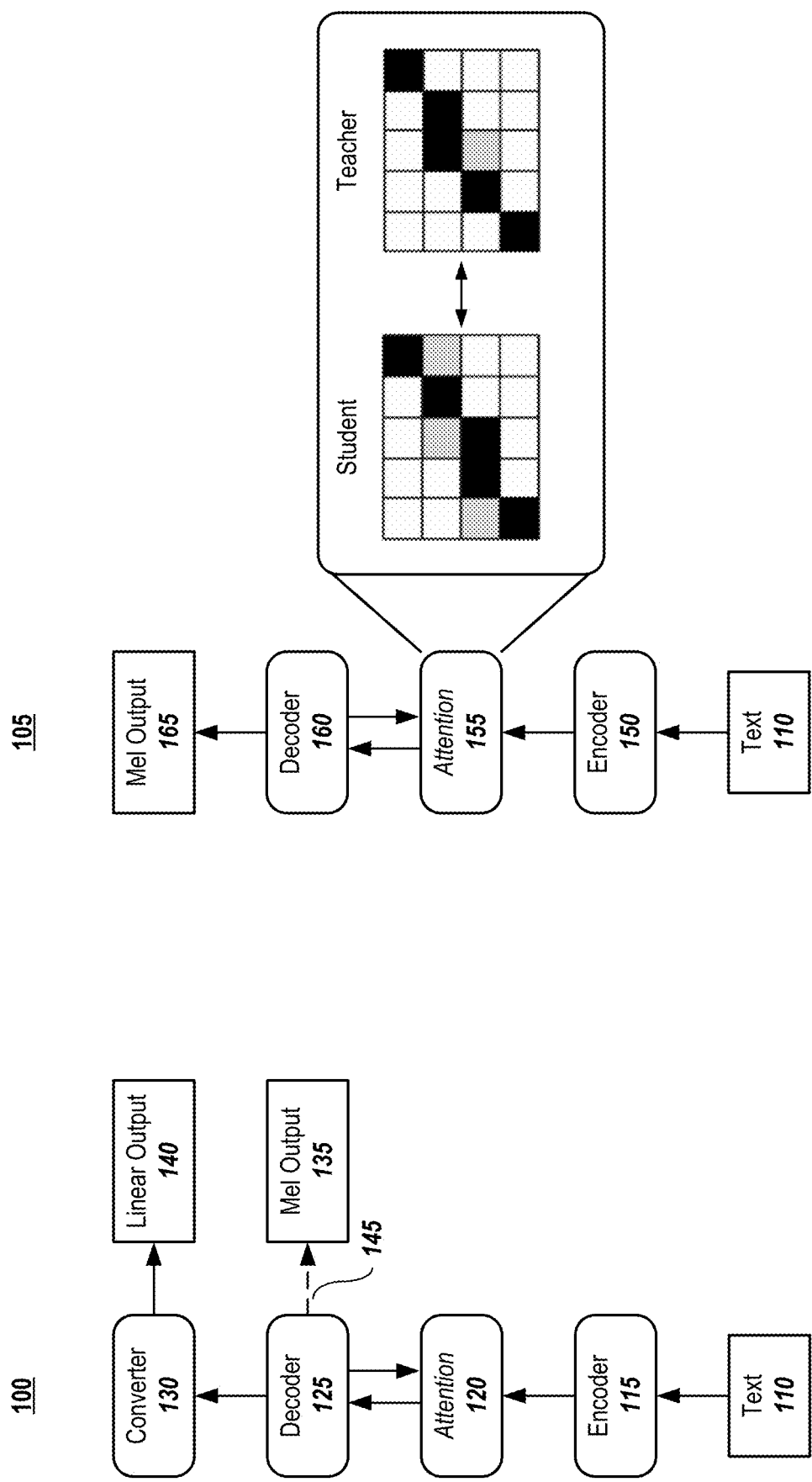
FIG. 1A depicts an autoregressive sequence-to-sequence model, according to embodiments of the present disclosure.
FIG. 1B depicts a non-autoregressive model, which distills the attention from a pretrained autoregressive model, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "layer" may comprise one or more operations.

Any headings used herein are for organizational purposes only and shall not be used to limit the scope of the description or the claims. Each reference/document mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Text-to-speech (TTS), also called speech synthesis, has long been a vital tool in a variety of applications, such as human-computer interactions, virtual assistant, and content creation. Traditional TTS systems are based on multi-stage hand-engineered pipelines. In recent years, deep neural networks based autoregressive models have attained state-of-the-art results, including high-fidelity audio synthesis, and much simpler sequence-to-sequence (seq2seq) pipelines. In particular, embodiments of one of the most popular neural TTS pipeline comprises two components (embodiments of which are disclosed in U.S. patent application Ser. No. 16/058,265, filed on Aug. 8, 2018, entitled "SYSTEMS AND METHODS FOR NEURAL TEXT-TO-SPEECH USING CONVOLUTIONAL SEQUENCE LEARNING," listing Sercan Arık, Wei Ping, Kainan Peng, Sharan Narang, Ajay Kannan, Andrew Gibiansky, Jonathan Raiman, and John Miller as inventors, which patent document is incorporated in its entirety herein by reference) (which disclosure may be referred to, for convenience, as "Deep Voice 3" or "DV3"): (i) an autoregressive seq2seq model that generates mel spectrogram from text, and (ii) an autoregressive neural vocoder (e.g., WaveNet) that generates raw waveform from mel spectrogram. This pipeline requires much less expert knowledge and uses pairs of audio and transcript as training data.

However, the autoregressive nature of these models makes them quite slow at synthesis, because they operate sequentially at a high temporal resolution of waveform samples or acoustic features (e.g., spectrogram). Most recently, parallel WaveNet and embodiments disclosed in U.S. patent application Ser. No. 16/277,919, filed on Feb. 15, 2019, entitled "SYSTEMS AND METHODS FOR PARALLEL WAVE GENERATION IN END-TO-END TEXT-TO-SPEECH," listing Wei Ping, Kainan Peng, and Jitong Chen as inventors, which patent document is incorporated in its entirety herein by reference) (which disclosure may be referred to, for convenience, as "ClariNet") are proposed for parallel waveform synthesis, but they still rely on autoregressive or recurrent components to predict the frame-level acoustic features (e.g., 100 frames per second), which can be slow at synthesis on modern hardware optimized for parallel execution.

In this patent document, embodiments of a non-autoregressive text-to-spectrogram model—a fully parallel neural TTS system—are presented. Some of the contributions presented herein include but are not limited to:

1. Embodiments of the first non-autoregressive attention-based architecture for TTS, which is fully convolutional and converts text to mel spectrogram. For convenience, the various embodiments may be referred to generally as "ParaNet." Embodiments of ParaNet iteratively refine the attention alignment between text and spectrogram in a layer-by-layer manner.

2. The non-autoregressive ParaNet embodiments are compared with autoregressive counterpart in terms of speech quality, synthesis speed and attention stability. A ParaNet embodiment achieves ~46.7 times speed-up over at one autoregressive model embodiment at synthesis, while maintaining comparable speech quality using WaveNet vocoder. Interestingly, the non-autoregressive ParaNet embodiments produce fewer attention errors on a challenging test sentences as compared to an autoregressive model embodiment, because it does not have the troublesome discrepancy between the teacher-forced training and autoregressive inference.

3. The first fully parallel neural TTS system was built by combining a non-autoregressive ParaNet embodiment with the inverse autoregressive flow (IAF)-based neural vocoder (e.g., ClariNet embodiments). It generates speech from text through a single feed-forward pass.

4. In addition, a novel approach, referred to for convenience as WaveVAE, was developed for training the IAF as a generative model for waveform samples. In contrast to probability density distillation methods, WaveVAE may be trained from scratch by using the IAF as the decoder in the variational autoencoder (VAE) framework.

The remainder of this patent document is as follows. Section B discusses related work. Embodiments of the non-autoregressive ParaNet architecture are described in Section C. WaveVAE embodiments are presented in Section D. Implementation details and experimental results are provided in Section E, and some conclusions are provided in Section F.

B. Related Work

Neural speech synthesis has obtained the state-of-the-art results and gained a lot of attention. Several neural TTS systems were proposed, including: novel architectures disclosed in commonly-assigned U.S. patent application Ser. No. 15/882,926, filed on 29 Jan. 2018, entitled "SYSTEMS AND METHODS FOR REAL-TIME NEURAL TEXT-TO-SPEECH," and U.S. Prov. Pat. App. No. 62/463,482, filed on 24 Feb. 2017, entitled "SYSTEMS AND METHODS FOR REAL-TIME NEURAL TEXT-TO-SPEECH," each of the aforementioned patent documents is incorporated by reference herein in its entirety (which disclosures may be referred to, for convenience, as "Deep Voice 1 or DV1"); novel architectures disclosed in commonly-assigned U.S. patent application Ser. No. 15/974,397, filed on 8 May 2018, entitled "SYSTEMS AND METHODS FOR MULTI-SPEAKER NEURAL TEXT-TO-SPEECH," and U.S. Prov. Pat. App. No. 62/508,579, filed on 19 May 2017, entitled "SYSTEMS AND METHODS FOR MULTI-SPEAKER NEURAL TEXT-TO-SPEECH," each of the aforementioned patent documents is incorporated by reference herein in its entirety (which disclosures may be referred to, for convenience, as "Deep Voice 2" or "DV2"); novel architectures disclosed in Deep Voice 3 (referenced above); novel architectures disclosed in ClariNet (referenced above); and in Tacotron, Tacotron 2, Char2Wav, and VoiceLoop.

In particular, Tacotron, Char2Wav, and embodiments of Deep Voice 3 employ seq2seq framework with the attention mechanism, yielding much simpler pipeline compared to traditional multi-stage pipeline. Their excellent extensibility leads to promising results for several challenging tasks, such as voice cloning. All of these state-of-the-art TTS systems are based on autoregressive models.

RNN-based autoregressive models, such as Tacotron and WaveRNN, lack parallelism at both training and synthesis. CNN-based autoregressive models, such as WaveNet and embodiments of Deep Voice 3, enable parallel processing at training, but they still operate sequentially at synthesis since each output element must be generated before it can be passed in as input at the next time-step. Recently, there are some non-autoregressive models proposed for neural machine translation. Gu et al. (J. Gu, J. Bradbury, C. Xiong, V. O. Li, and R. Socher. Non-autoregressive neural machine translation. In ICLR, 2018) train a feed-forward neural network conditioned on fertility values, which is obtained from an external alignment system. Kaiser et al. (L. Kaiser, A. Roy, A. Vaswani, N. Pamar, S. Bengio, J. Uszkoreit, and N. Shazeer. Fast decoding in sequence models using discrete latent variables. In ICML, 2018) proposed a latent variable model for fast decoding, while it remains autoregressiveness between latent variables. Lee et al. (J. Lee, E. Mansimov, and K. Cho. Deterministic non-autoregressive neural sequence modeling by iterative refinement. In EMNLP, 2018) iteratively refines the output sequence through a denoising autoencoder framework. Arguably, non-autoregressive model plays a more important role in text-to-speech, where the output speech spectrogram consists of hundreds of time-steps for a short text with a few words. To the best of our knowledge, this work is the first non-autoregressive seq2seq model for TTS and provides as much as 46.7 times speed-up at synthesis over its autoregressive counterpart.

Normalizing flows are a family of generative models, in which a simple initial distribution is transformed into a more complex one by applying a series of invertible transformations. Inverse autoregressive flow (IAF) is a special type of normalizing flow where each invertible transformation is based on an autoregressive neural network. IAF performs synthesis in parallel and can easily reuse the expressive autoregressive architecture, such as WaveNet, which leads to the state-of-the-art results for speech synthesis. Likelihood evaluation in IAF is autoregressive and slow, thus previous training methods rely on probability density distillation from a pretrained autoregressive model. RealNVP and Glow are different types of normalizing flows, where both synthesis and likelihood evaluation can be performed in parallel by enforcing bipartite architecture constraints. Most recently, both methods were applied as parallel neural vocoders. These models are less expressive than autoregressive and IAF models, because half of the variables are unchanged after each transformation. As a result, these bipartite flows usually require deeper layers, larger hidden size, and huge number of parameters. For example, WaveGlow has ~200 M parameters, whereas WaveNet and ClariNet embodiments only use ~1.7 M parameters, making them more preferred in production deployment. In this patent document, one focus is on autoregressive and IAF-based neural vocoders.

Variational autoencoder (VAE) has been applied for representation learning of natural speech for years. It models either the generative process of waveform samples or spectrograms. Autoregressive or recurrent neural networks have been employed as the decoder of VAE, but they can be quite slow at synthesis. In embodiments herein, the feed-forward IAF is employed as the decoder, which enables parallel waveform synthesis.

C. Non-Autoregressive seq2seq Model Embodiments

Embodiments of a parallel TTS system comprise two components: 1) a feed-forward text-to-spectrogram model, and 2) a parallel waveform synthesizer conditioned on spectrogram. In this section, an autoregressive text-to-spectrogram model, such as one derived from Deep Voice 3, is first presented. Then, ParaNet embodiments—non-autoregressive text-to-spectrogram models—are presented.

By way of general comparison, consider the high-level diagrams of FIG. 1A (autoregressive) and FIG. 1B (non-autoregressive). FIG. 1A depicts an autoregressive seq2seq model, according to embodiments of the present disclosure. The dashed line 145 depicts the autoregressive decoding of the mel spectrogram at inference. FIG. 1B depicts a non-autoregressive model, which distills the attention from a pretrained autoregressive model, according to embodiments of the present disclosure.

1. Autoregressive Architecture Embodiments a) Example Model Architecture Embodiments

Embodiments of the autoregressive model may be based on a Deep Voice 3 embodiment or embodiments—a fully-convolutional text-to-spectrogram model, which comprises three components:

Encoder 115:

A convolutional encoder, which takes text inputs and encodes them into an internal hidden representation.

Decoder 125:

A causal convolutional decoder, which decodes the encoder representation with an attention mechanism 120 to log-mel spectrograms 135 in an autoregressive manner, in which the output of the decoder at a timestep is used as an input for the next timestep for the decoder, with an $l_1$ loss. It starts with 1×1 convolutions to preprocess the input log-mel spectrograms.

Converter 130:

A non-causal convolutional post-processing network, which processes the hidden representation from the decoder using both past and future context information and predicts the log-linear spectrograms with an $l_1$ loss. It enables bidirectional processing.

In one or more embodiments, all these components use the same 1-D convolution with a gated linear unit. A major difference between embodiments of ParaNet model and the DV3 embodiment is the decoder architecture. The decoder 125 of the DV3 embodiment 100 has multiple attention-based layers, where each layer comprises a causal convolution block followed by an attention block. To simplify the attention distillation described in Section C.3.a, embodiments of the autoregressive decoder herein have one attention block at its first layer. It was found that that reducing the number of attention blocks did not hurt the generated speech quality in general.

Figure 2:
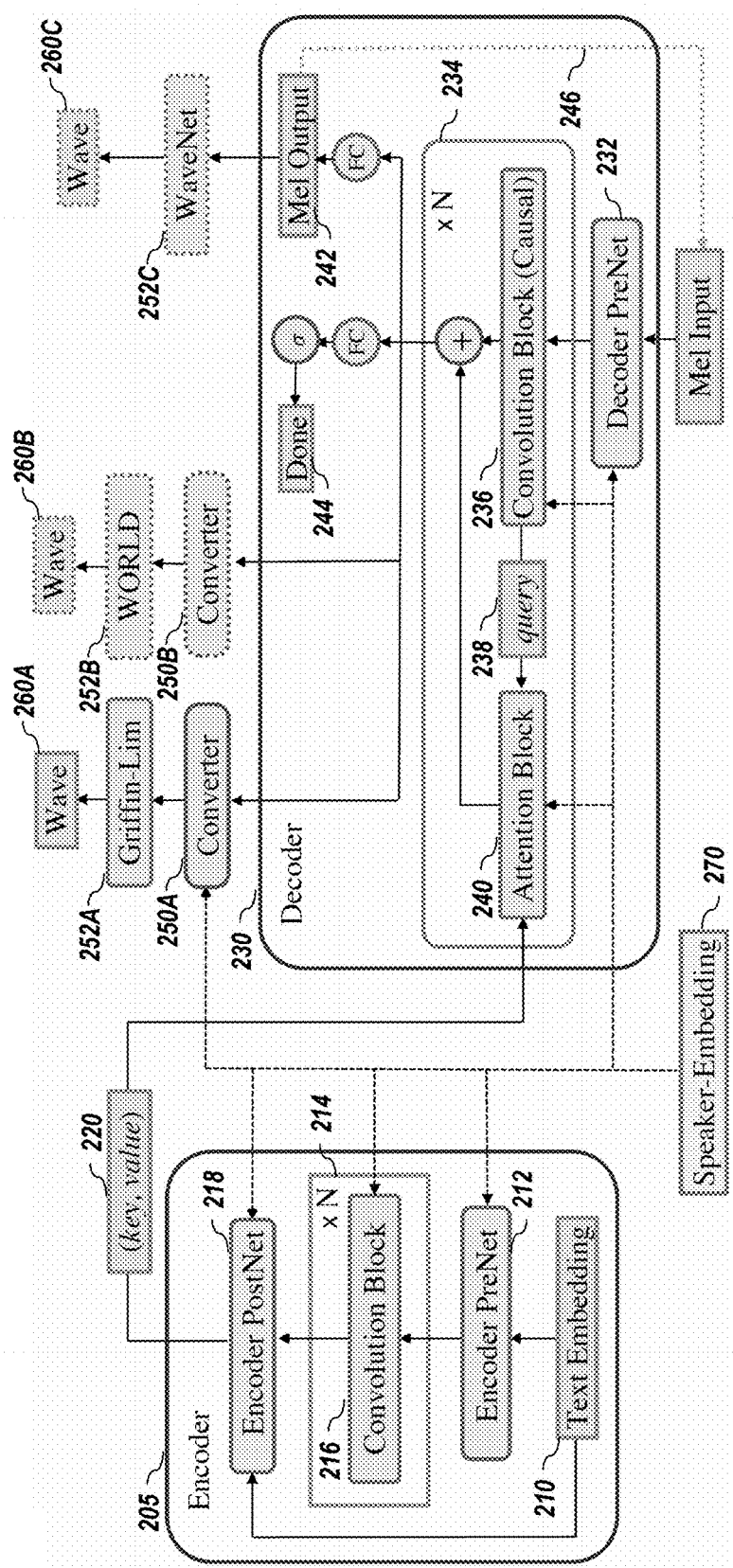
FIG. 2 graphical depicts an autoregressive architecture 200, according to embodiments of the present disclosure.

FIG. 2 graphical depicts an example autoregressive architecture 200, according to embodiments of the present disclosure. In one or more embodiments, the architecture 200 uses residual convolutional layers in an encoder 205 to encode text into per-timestep key and value vectors 220 for an attention-based decoder 230. In one or more embodiments, the decoder 230 uses these to predict the mel-scale log magnitude spectrograms 242 that correspond to the output audio. In FIG. 2, the dotted arrow 246 depicts the autoregressive synthesis process during inference (during training, mel-spectrogram frames from the ground truth audio corresponding to the input text are used). In one or more embodiments, the hidden states of the decoder 230 are then fed to a converter network 250 to predict the vocoder parameters for waveform synthesis to produce an output wave 260.

In one or more embodiments, the overall objective function to be optimized may be a linear combination of the losses from the decoder and the converter. In one or more embodiments, the decoder 210 and converter 215 are separated and multi-task training is applied, because it makes attention learning easier in practice. To be specific, in one or more embodiments, the loss for mel-spectrogram prediction guides training of the attention mechanism, because the attention is trained with the gradients from mel-spectrogram prediction (e.g., using an L1 loss for the mel-spectrograms) besides vocoder parameter prediction.

In a multi-speaker embodiment, trainable speaker embeddings 270 as in Deep Voice 2 embodiments may be used across encoder 205, decoder 230, and converter 250.

Figure 3:
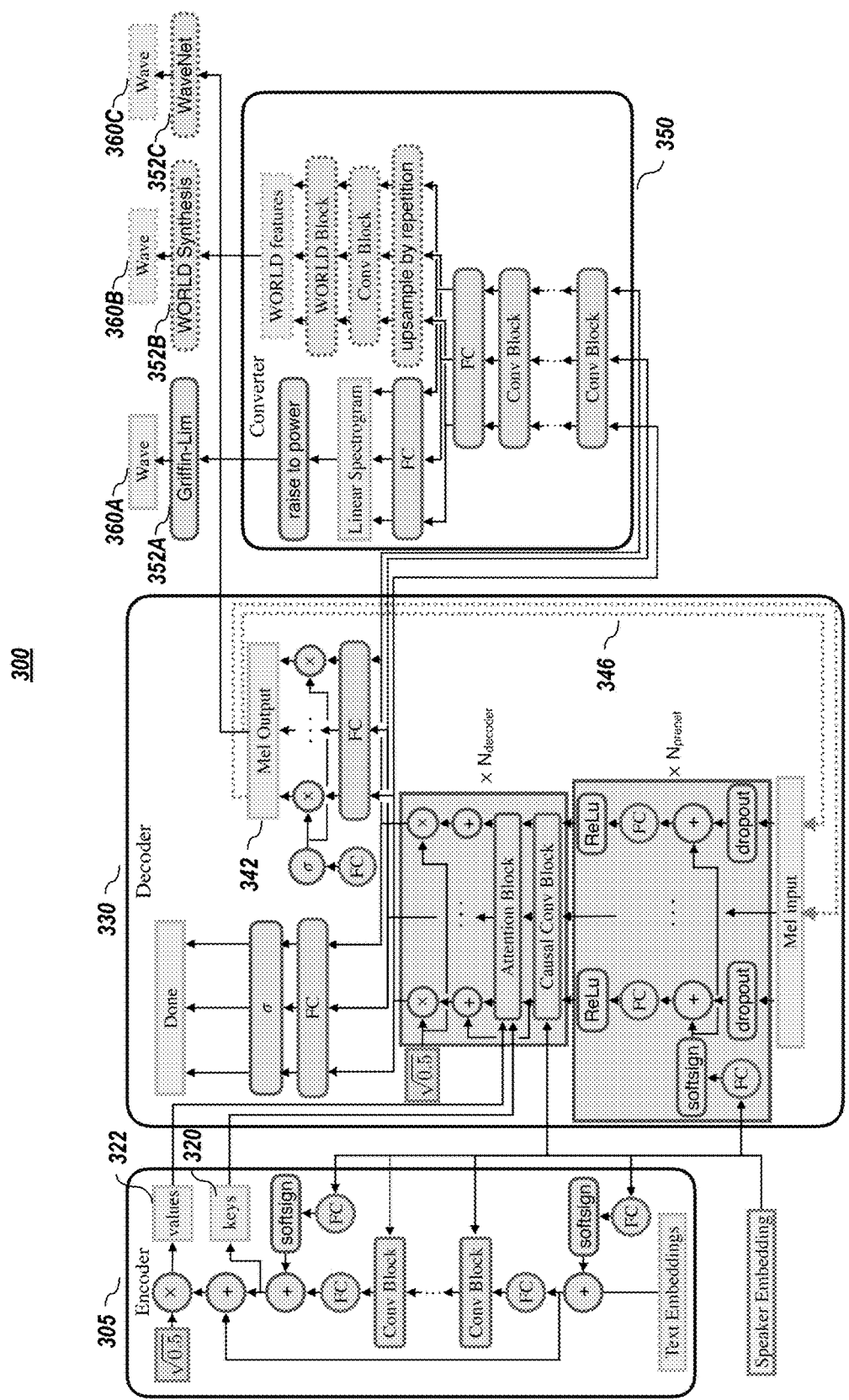
FIG. 3 graphically depicts an alternative autoregressive model architecture, according to embodiments of the present disclosure.

FIG. 3 graphically depicts an alternative autoregressive model architecture, according to embodiments of the present disclosure. In one or more embodiments, the model 300 uses a deep residual convolutional network to encode text and/or phonemes into per-timestep key 320 and value 322 vectors for an attentional decoder 330. In one or more embodiments, the decoder 330 uses these to predict the mel-band log magnitude spectrograms 342 that correspond to the output audio. The dotted arrows 346 depict the autoregressive synthesis process during inference. In one or more embodiments, the hidden state of the decoder is fed to a converter network 350 to output linear spectrograms for Griffin-Lim 352A or parameters for WORLD 352B, which can be used to synthesize the final waveform. In one or more embodiments, weight normalization is applied to all convolution filters and fully connected layer weight matrices in the model. As illustrated in the embodiment depicted in FIG. 3, WaveNet 352 does not require a separate converter as it takes as input mel-band log magnitude spectrograms.

Example hyperparameters of for a model embodiment provided in Table 1, below.

TABLE 1

Example Hyperparameters

| Parameter | Single-Speaker |
|---|---|
| FFT Size | 4096 |
| FFT Window Size/Shift | 2400/600 |
| Audio Sample Rate | 48000 |
| Reduction Factor r | 4 |
| Mel Bands | 80 |
| Sharpening Factor | 1.4 |
| Character Embedding Dim. | 256 |
| Encoder Layers/Conv. Width/Channels | 7/5/64 |
| Decoder Affine Size | 128,256 |
| Decoder Layers/Conv. Width | 4/5 |
| Attention Hidden Size | 128 |
| Position Weight/Initial Rate | 1.0/6.3 |
| Converter Layers/Conv. Width/Channels | 5/5/256 |
| Dropout Probability | 0.95 |
| Number of Speakers | 1 |
| Speaker Embedding Dim. | — |
| ADAM Learning Rate | 0.001 |
| Anneal Rate/Anneal Interval | — |
| Batch Size | 16 |
| Max Gradient Norm | 100 |
| Gradient Clipping Max. Value | 5 |

Figure 4:
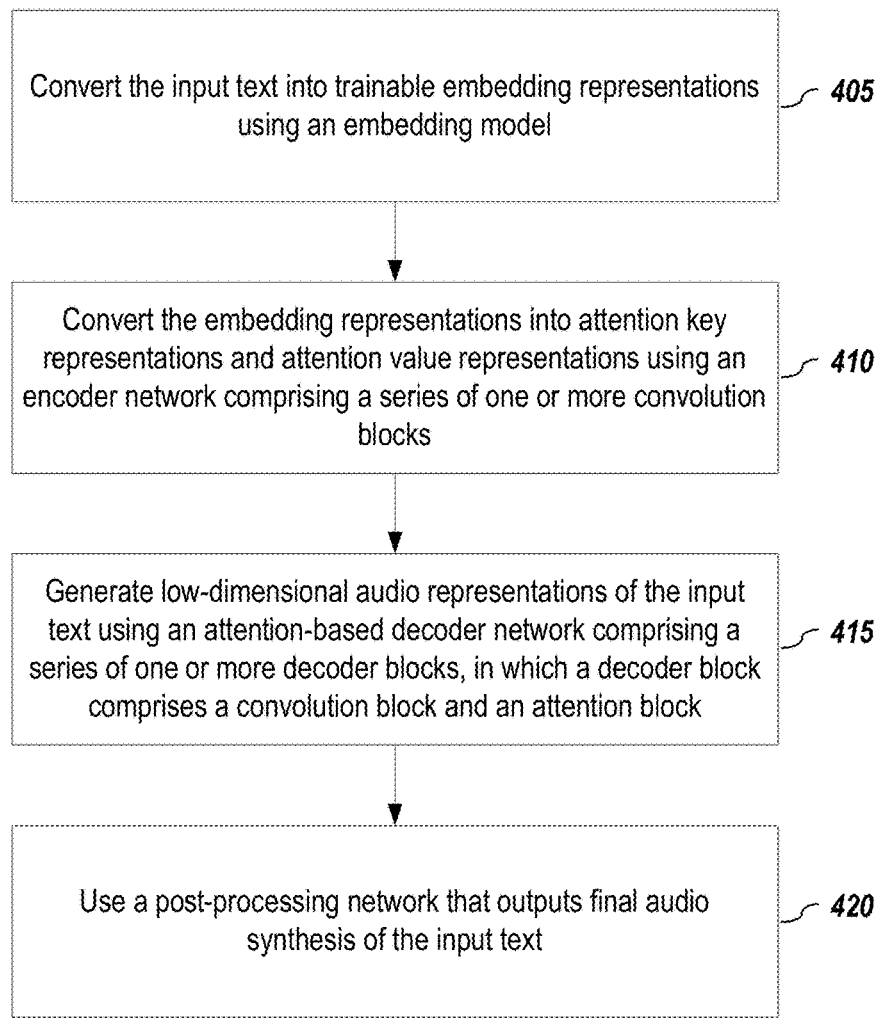
FIG. 4 depicts a general overview methodology for using a text-to-speech architecture, according to embodiments of the present disclosure.

FIG. 4 depicts a general overview methodology for using a text-to-speech architecture, such as depicted in FIG. 1A, FIG. 2, or FIG. 3, according to embodiments of the present disclosure. In one or more embodiments, an input text in converted (405) into trainable embedding representations using an embedding model, such as text embedding model 210. The embedding representations are converted (410) into attention key representations 220 and attention value representations 220 using an encoder network 205, which comprises a series 214 of one or more convolution blocks 216. These attention key representations 220 and attention value representations 220 are used by an attention-based decoder network, which comprises a series 234 of one or more decoder blocks 234, in which a decoder block 234 comprises a convolution block 236 that generates a query 238 and an attention block 240, to generate (415) low-dimensional audio representations (e.g., 242) of the input text. In one or more embodiments, the low-dimensional audio representations of the input text may undergo additional processing by a post-processing network (e.g., 250A/252A, 250B/252B, or 252C) that predicts (420) final audio synthesis of the input text. As noted above, speaker embeddings 270 may be used in the process 105, 200, or 300 to cause the synthesized audio to exhibit one or more audio characteristics (e.g., a male voice, a female voice, a particular accent, etc.) associated with a speaker identifier or speaker embedding.

b) Text Preprocessing Embodiments

Text preprocessing can be important for good performance. Feeding raw text (characters with spacing and punctuation) yields acceptable performance on many utterances. However, some utterances may have mispronunciations of rare words, or may yield skipped words and repeated words. In one or more embodiments, these issues may be alleviated by normalizing the input text as follows:

1. Uppercase all characters in the input text.
2. Remove all intermediate punctuation marks.
3. End every utterance with a period or question mark.
4. Replace spaces between words with special separator characters which indicate the duration of pauses inserted by the speaker between words. In one or more embodiments, four different word separators may be used, indicating (i) slurred-together words, (ii) standard pronunciation and space characters, (iii) a short pause between words, and (iv) a long pause between words. For example, the sentence "Either way, you should shoot very slowly," with a long pause after "way" and a short pause after "shoot", would be written as "Either way % you should shoot/very slowly %." with % representing a long pause and/representing a short pause for encoding convenience. In one or more embodiments, the pause durations may be obtained through either manual labeling or estimated by a text-audio aligner such as Gentle. In one or more embodiments, the single-speaker dataset was labeled by hand, and the multi-speaker datasets were annotated using Gentle.

c) Joint Representation of Characters and Phonemes Embodiments

Deployed TTS systems may, in one or more embodiments, preferably include a way to modify pronunciations to correct common mistakes (which typically involve, for example, proper nouns, foreign words, and domain-specific jargon). A conventional way to do this is to maintain a dictionary to map words to their phonetic representations.

In one or more embodiments, the model can directly convert characters (including punctuation and spacing) to acoustic features, and hence learns an implicit grapheme-to-phoneme model. This implicit conversion can be difficult to correct when the model makes mistakes. Thus, in addition to character models, in one or more embodiments, phoneme-only models and/or mixed character-and-phoneme models may be trained by allowing phoneme input option explicitly. In one or more embodiments, these models may be identical to character-only models, except that the input layer of the encoder sometimes receives phoneme and phoneme stress embeddings instead of character embeddings.

In one or more embodiments, a phoneme-only model requires a preprocessing step to convert words to their phoneme representations (e.g., by using an external phoneme dictionary or a separately trained grapheme-to-phoneme model). For embodiments, Carnegie Mellon University Pronouncing Dictionary, CMUDict 0.6b, was used. In one or more embodiments, a mixed character-and-phoneme model requires a similar preprocessing step, except for words not in the phoneme dictionary. These out-of-vocabulary/out-of-dictionary words may be input as characters, allowing the model to use its implicitly learned grapheme-to-phoneme model. While training a mixed character-and-phoneme model, every word is replaced with its phoneme representation with some fixed probability at each training iteration. It was found that this improves pronunciation accuracy and minimizes attention errors, especially when generalizing to utterances longer than those seen during training. More importantly, models that support phoneme representation allow correcting mispronunciations using a phoneme dictionary, a desirable feature of deployed systems.

In one or more embodiments, the text embedding model may comprise a phoneme-only model and/or a mixed character-and-phoneme model.

d) Convolution Blocks for Sequential Processing Embodiments

By providing a sufficiently large receptive field, stacked convolutional layers can utilize long-term context information in sequences without introducing any sequential dependency in computation. In one or more embodiments, a convolution block is used as a main sequential processing unit to encode hidden representations of text and audio.

Figure 5:
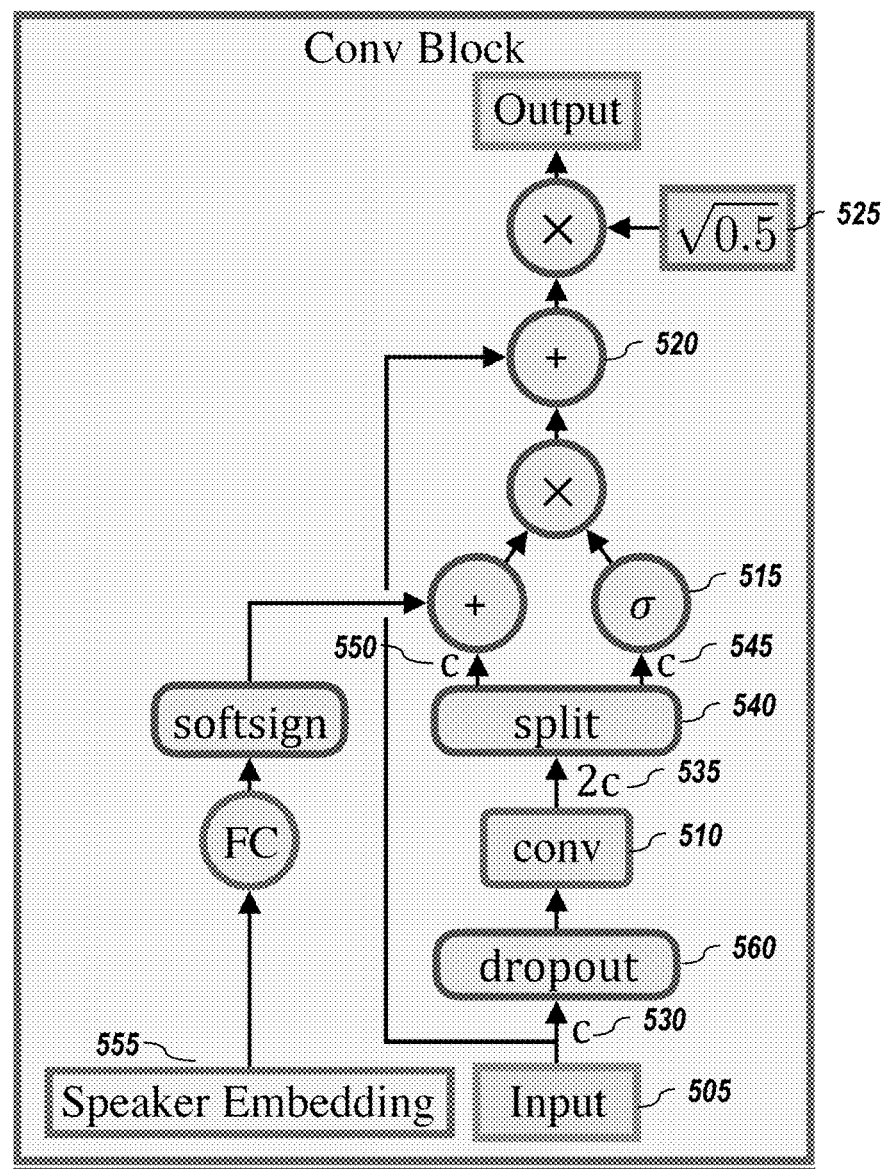
FIG. 5 graphically depicts a convolution block comprising a one-dimensional (1D) convolution with gated linear unit, and residual connection, according to embodiments of the present disclosure.

FIG. 5 graphically depicts a convolution block comprising a one-dimensional (1D) convolution with gated linear unit, and residual connection, according to embodiments of the present disclosure. In one or more embodiments, the convolution block 500 comprises a one-dimensional (1D) convolution filter 510, a gated-linear unit 515 as a learnable nonlinearity, a residual connection 520 to the input 505, and a scaling factor 525. In the depicted embodiment, the scaling factor is $\sqrt{0.5}$, although different values may be used. The scaling factor helps ensures that the input variance is preserved early in training. In the depicted embodiment in FIG. 5, c (530) denotes the dimensionality of the input 505, and the convolution output of size 2·c (535) may be split 540 into equal-sized portions: the gate vector 545 and the input vector 550. The gated linear unit provides a linear path for the gradient flow, which alleviates the vanishing gradient issue for stacked convolution blocks while retaining nonlinearity. In one or more embodiments, to introduce speaker-dependent control, a speaker-dependent embedding 555 may be added as a bias to the convolution filter output, after a softsign function. In one or more embodiments, a softsign nonlinearity is used because it limits the range of the output while also avoiding the saturation problem that exponential-based nonlinearities sometimes exhibit. In one or more embodiments, the convolution filter weights are initialized with zero-mean and unit-variance activations throughout the entire network.

The convolutions in the architecture may be either non-causal (e.g., in encoder 205/305 and converter 250/350) or causal (e.g., in decoder 230/330). In one or more embodiments, to preserve the sequence length, inputs are padded with k−1 timesteps of zeros on the left for causal convolutions and (k−1)/2 timesteps of zeros on the left and on the right for non-causal convolutions, where k is an odd convolution filter width (in embodiments, odd convolution widths were used to simplify the convolution arithmetic, although even convolutions widths and even k values may be used). In one or more embodiments, dropout 560 is applied to the inputs prior to the convolution for regularization.

e) Encoder Embodiments

In one or more embodiments, the encoder network (e.g., encoder 205/305) begins with an embedding layer, which converts characters or phonemes into trainable vector representations, $h_e$. In one or more embodiments, these embeddings $h_e$ are first projected via a fully-connected layer from the embedding dimension to a target dimensionality. Then, in one or more embodiments, they are processed through a series of convolution blocks to extract time-dependent text information. Lastly, in one or more embodiments, they are projected back to the embedding dimension to create the attention key vectors $h_k$. The attention value vectors may be computed from attention key vectors and text embeddings, $h_v = \sqrt{0.5}(h_k + h_e)$, to jointly consider the local information in $h_e$ and the long-term context information in $h_k$. The key vectors $h_k$ are used by each attention block to compute attention weights, whereas the final context vector is computed as a weighted average over the value vectors $h_v$.

f) Decoder Embodiments

In one or more embodiments, the decoder network (e.g., decoder 230/330) generates audio in an autoregressive manner by predicting a group of r future audio frames conditioned on the past audio frames. Since the decoder is autoregressive, in embodiments, it uses causal convolution blocks. In one or more embodiments, a mel-band log-magnitude spectrogram was chosen as the compact low-dimensional audio frame representation, although other representations may be used. It was empirically observed that decoding multiple frames together (i.e., having r>1) yields better audio quality.

In one or more embodiments, the decoder network starts with a plurality of fully-connected layers with rectified linear unit (ReLU) nonlinearities to preprocess input mel-spectrograms (denoted as "PreNet" in FIG. 2). Then, in one or more embodiments, it is followed by a series of decoder blocks, in which a decoder block comprises a causal convolution block and an attention block. These convolution blocks generate the queries used to attend over the encoder's hidden states. Lastly, in one or more embodiments, a fully-connected layer outputs the next group of r audio frames and also a binary "final frame" prediction (indicating whether the last frame of the utterance has been synthesized). In one or more embodiments, dropout is applied before each fully-connected layer prior to the attention blocks, except for the first one.

An L1 loss may be computed using the output mel-spectrograms, and a binary cross-entropy loss may be computed using the final-frame prediction. L1 loss was selected since it yielded the best result empirically. Other losses, such as L2, may suffer from outlier spectral features, which may correspond to non-speech noise.

g) Attention Block Embodiments

Figure 6:
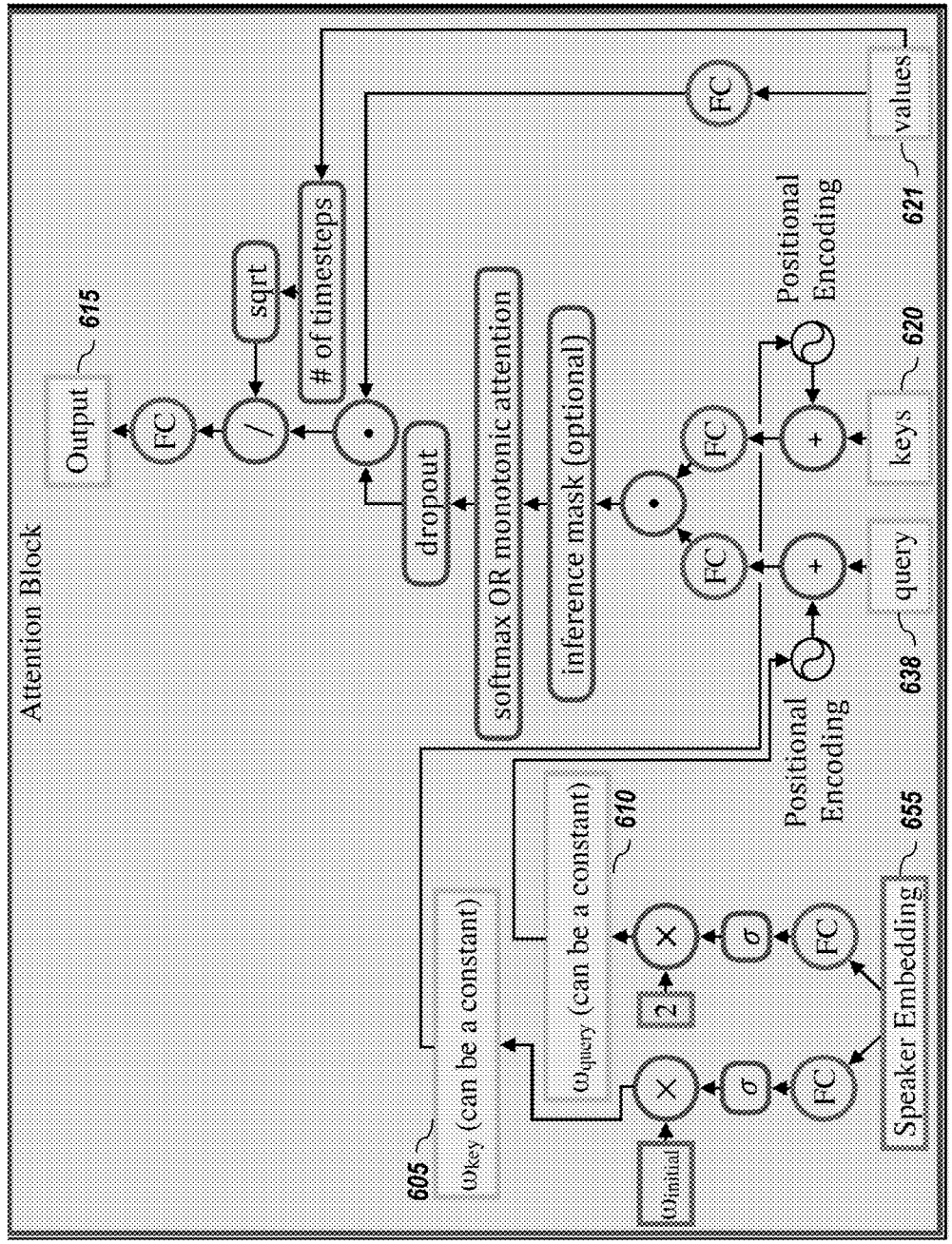
FIG. 6 graphically depicts an attention block, according to embodiments of the present disclosure.

FIG. 6 graphically depicts an embodiment of an attention block, according to embodiments of the present disclosure. As shown in FIG. 6, in one or more embodiments, positional encodings may be added to both keys 620 and query 638 vectors, with rates of $\omega_{key}$ 405 and $\omega_{query}$ 410, respectively. Forced monotonocity may be applied at inference by adding a mask of large negative values to the logits. One of two possible attention schemes may be used: softmax or monotonic attention. In one or more embodiments, during training, attention weights are dropped out.

In one or more embodiments, a dot-product attention mechanism (depicted in FIG. 6) is used. In one or more embodiments, the attention mechanism uses a query vector 638 (the hidden states of the decoder) and the per-timestep key vectors 620 from the encoder to compute attention weights, and then outputs a context vector 615 computed as the weighted average of the value vectors 621.

In one or more embodiments, empirical benefits were observed from introducing an inductive bias where the attention follows a monotonic progression in time. Thus, in one or more embodiments, a positional encoding was added to both the key and the query vectors. These positional encodings hp may be chosen as $h_p(i)=\sin(\omega_s i/10000^{k/d})$ (for even i) or $\cos(\omega_s i/10000^{k/d})$ (for odd i), where i is the timestep index, k is the channel index in the positional encoding, d is the total number of channels in the positional encoding, and $\omega_s$ is the position rate of the encoding. In one or more embodiments, the position rate dictates the average slope of the line in the attention distribution, roughly corresponding to speed of speech. For a single speaker, $\omega_s$ may be set to one for the query and may be fixed for the key to the ratio of output timesteps to input timesteps (computed across the entire dataset). For multi-speaker datasets, $\omega_s$ may be computed for both the key and the query from the speaker embedding for each speaker (e.g., depicted in FIG. 6). As sine and cosine functions form an orthonormal basis, this initialization yields an attention distribution in the form of a diagonal line. In one or more embodiments, the fully connected layer weights used to compute hidden attention vectors are initialized to the same values for the query projection and the key projection. Positional encodings may be used in all attention blocks. In one or more embodiments, a context normalization was used. In one or more embodiments, a fully connected layer is applied to the context vector to generate the output of the attention block. Overall, positional encodings improve the convolutional attention mechanism.

Production-quality TTS systems have very low tolerance for attention errors. Hence, besides positional encodings, additional strategies were considered to eliminate the cases of repeating or skipping words. One approach which may be used is to substitute the canonical attention mechanism with the monotonic attention mechanism, which approximates hard-monotonic stochastic decoding with soft-monotonic attention by training in expectation. Hard monotonic attention may also be accomplished by sampling. It aims was to improve the inference speed by attending over states that are selected via sampling, and thus avoiding compute over future states. Embodiments herein do not benefit from such speedup, and poor attention behavior in some cases, e.g., being stuck on the first or last character, were observed. Despite the improved monotonicity, this strategy may yield a more diffused attention distribution. In some cases, several characters are attended at the same time and high-quality speech could not be obtained. This may be attributed to the unnormalized attention coefficients of the soft alignment, potentially resulting in weak signal from the encoder. Thus, in one or more embodiments, an alternative strategy of constraining attention weights only at inference to be monotonic, preserving the training procedure without any constraints, was used. Instead of computing the softmax over the entire input, the softmax may be computed over a fixed window starting at the last attended-to position and going forward several timesteps. In experiments, a window size of three was used, although other window sizes may be used. In one or more embodiments, the initial position is set to zero and is later computed as the index of the highest attention weight within the current window.

2. Non-Autoregressive Architecture Embodiments

Figure 7:
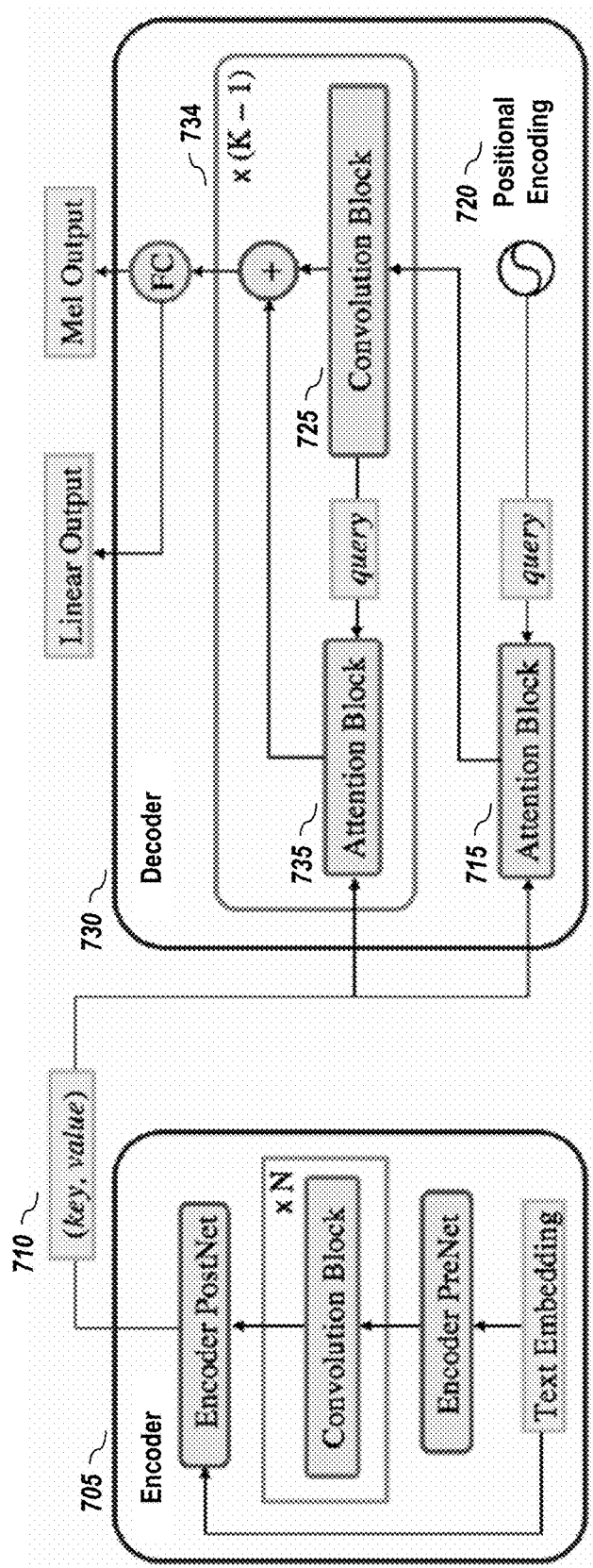
FIG. 7 depicts a non-autoregressive model architecture (i.e., a ParaNet embodiment), according to embodiments of the present disclosure.
Figure 8:
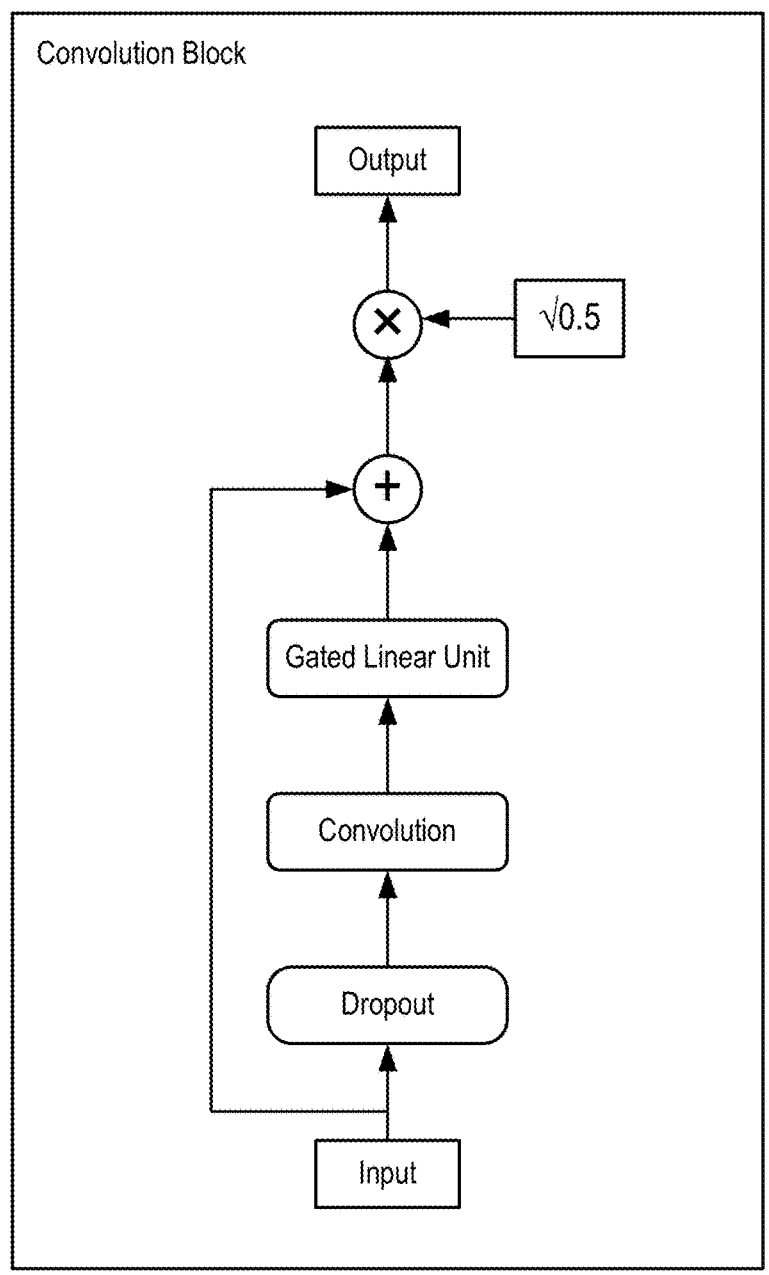
FIG. 8 graphically depicts a convolution block, according to embodiments of the present disclosure.
Figure 9:
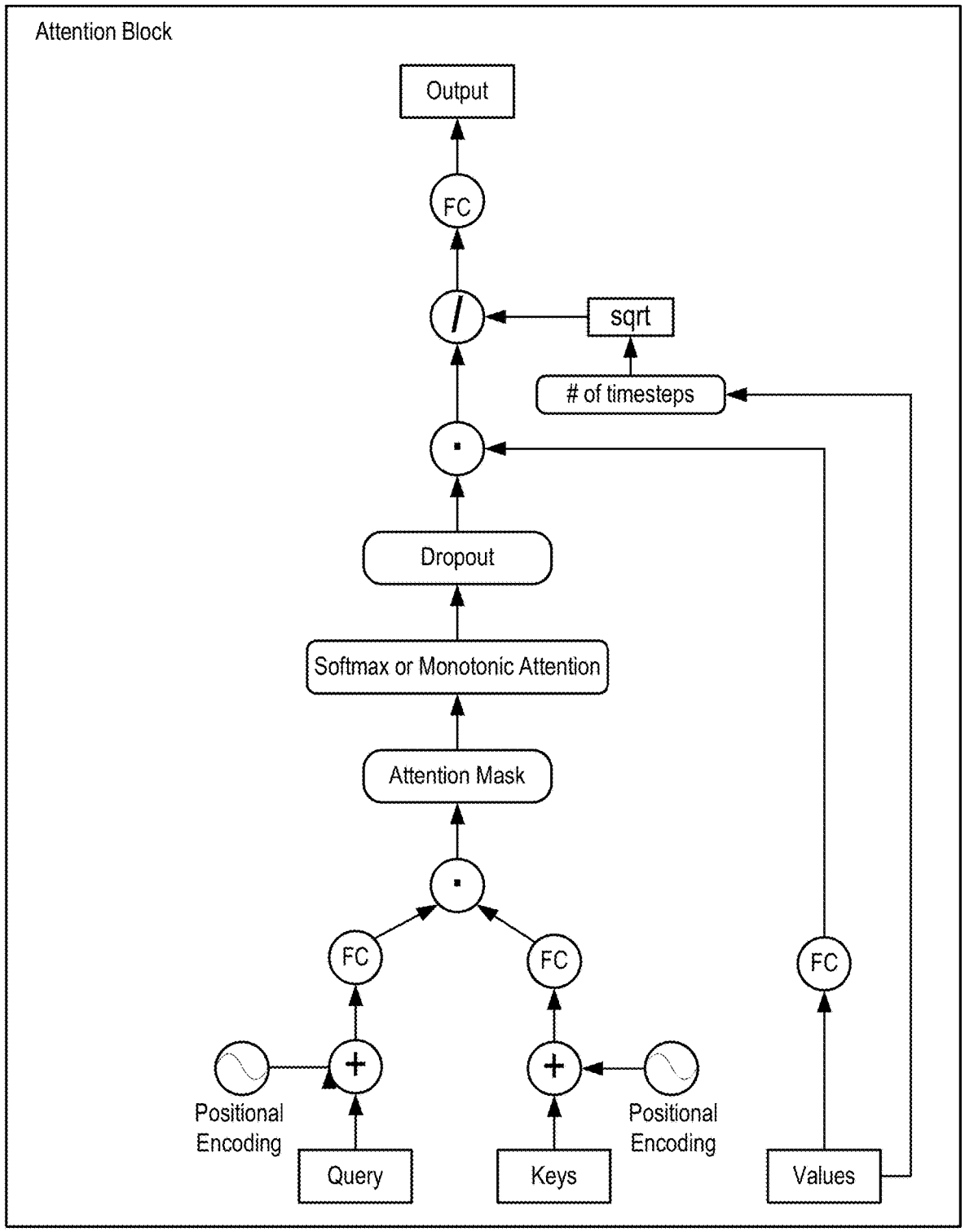
FIG. 9 graphically depicts an attention block, according to embodiments of the present disclosure.

FIG. 7 depicts a non-autoregressive model architecture (i.e., a ParaNet embodiment), according to embodiments of the present disclosure. In one or more embodiments, the model architecture 700 may use the same or similar encoder architecture 705 as an autoregressive model—embodiments of which were presented in the prior section. In one or more embodiments, the decoder 730 of ParaNet, conditioned solely on the hidden representation from the encoder, predicts the entire sequence of log-mel spectrograms in a feed-forward manner. As a result, both its training and synthesis may be done in parallel. In one or more embodiments, the encoder 705 provides key and value 710 as the textual representation, and the first attention block 715 in the decoder gets positional encoding 720 as the query and followed by a set of decoder blocks 734, which comprise a non-causal convolution block 725 and an attention block 735. FIG. 8 graphically depicts a convolution block, such as a convolution block 725, according to embodiments of the present disclosure. In embodiments, the output of the convolution block comprises a query and an intermediate output, in which the query may be sent to an attention block and the intermediate output may be combined with a context representation from an attention block. FIG. 9 graphically depicts an attention block, such as attention block 735, according to embodiments of the present disclosure. It shall be noted that the convolution block 800 and the attention block 900 are similar to the convolution block 500 in FIG. 5 and the attention block 600 in FIG. 6, with some exceptions: (1) elements related to the speaking embedding have been removed in both blocks (although embodiments may include them), and (2) the embodiment of the attention block in FIG. 9 depicts a different masking embodiment, i.e., an attention masking which is described in more detail, below.

In one or more embodiments, the following major architecture modifications of an autoregressive seq2seq model, such as DV3, may be made to create a non-autoregressive model:

Non-Autoregressive Decoder 730 Embodiments:

Without the autoregressive generative constraint, the decoder can use non-causal convolution blocks to take advantage of future context information and to improve model performance. In addition to log-mel spectrograms, it also predicts log-linear spectrograms with an $l_1$ loss for slightly better performance. In embodiments, the output of the convolution block 725 comprises a query and an intermediate output, which may be split in which the query is sent to an attention block and the intermediate output is combined with a context representation coming from the attention block 735 in order to form a decoder block 730 output. The decoder block output is sent to the next decoder block, or if it is the last decoder block, may be sent to a fully connected layer to obtain the final output representation (e.g., a linear spectrogram output, mel spectrogram output, etc.).

No Converter:

Non-autoregressive model embodiments remove the non-causal converter since they already employ a non-causal decoder. Note that, a motivation for introducing non-causal converter in Deep Voice 3 embodiments was to refine the decoder predictions based on bidirectional context information provided by non-causal convolutions.

3. Attention Mechanism Embodiments

Figure 10:
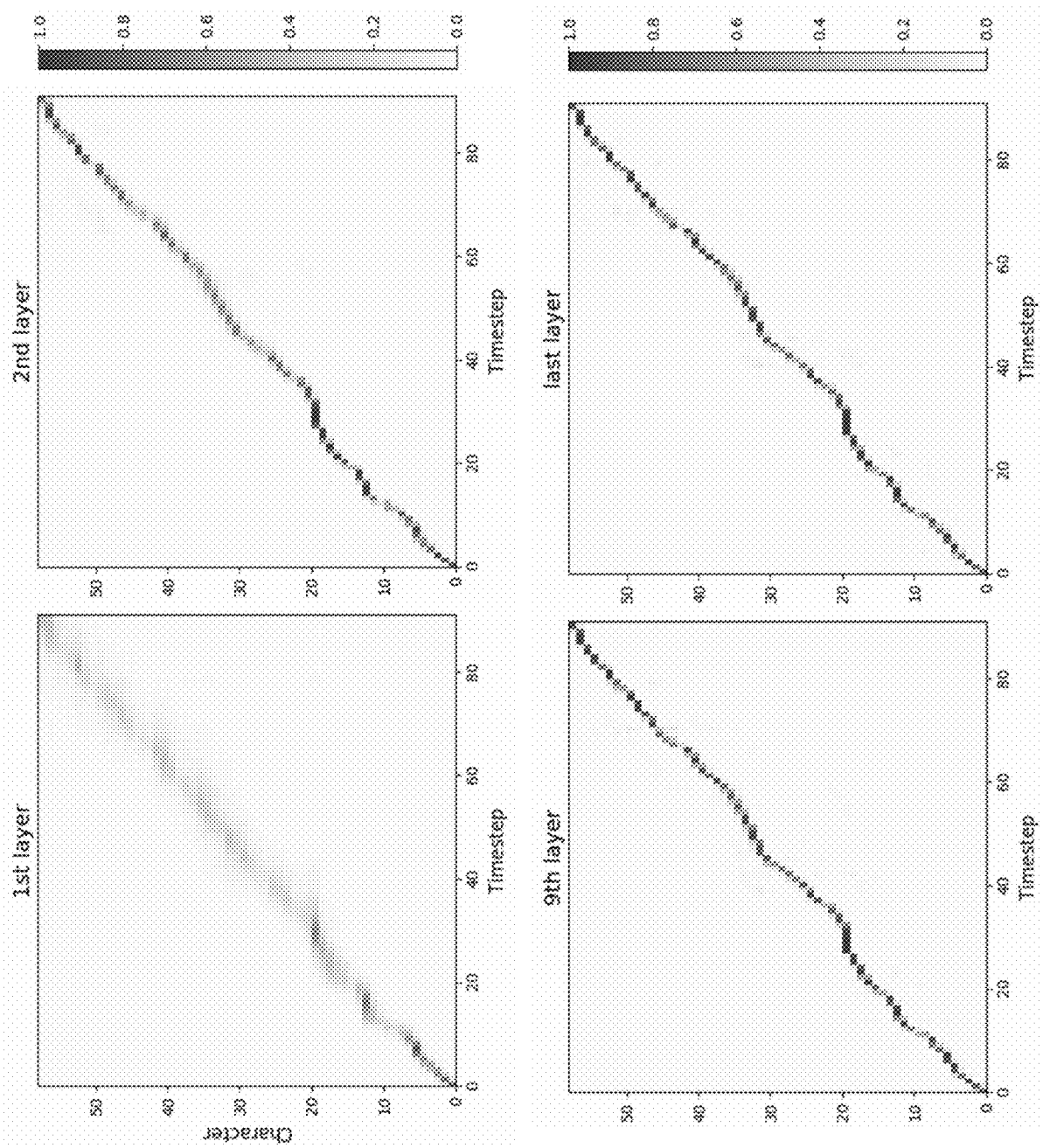
FIG. 10 depicts a ParaNet embodiment iteratively refining the attention alignment in a layer-by-layer way, according to embodiments of the present disclosure.

It may be challenging for a non-autoregressive model embodiment to learn the accurate alignment between the input text and output spectrogram. Previous non-autoregressive decoders rely on an external alignment system, or an autoregressive latent variable model. In one or more embodiments, several simple & effective techniques are presented that obtain accurate and stable alignment with a multi-step attention. Embodiments of the non-autoregressive decoder herein can iteratively refine the attention alignment between text and mel spectrogram in a layer-by-layer manner as illustrated in FIG. 10. In one or more embodiments, a non-autoregressive decoder adopts a dot-product attention mechanism and comprises K attention blocks (see FIG. 7), where each attention block uses the per-time-step query vectors from a convolution block and per-time-step key vectors from the encoder to compute the attention weights. The attention block then computes context vectors as the weighted average of the value vectors from the encoder. In one or more embodiments, the decoder starts with an attention block, in which the query vectors are solely positional encoding (see Section C.3.b for additional details). The first attention block then provides the input for the convolution block at the next attention-based layer.

FIG. 10 depicts a ParaNet embodiment iteratively refining the attention alignment in a layer-by-layer way, according to embodiments of the present disclosure. One can see the 1st layer attention is mostly dominated by the positional encoding prior. It becomes more and more confident about the alignment in the subsequent layers.

a) Attention Distillation Embodiments

In one or more embodiments, the attention alignments from a pretrained autoregressive model are used to guide the training of non-autoregressive model. In one or more embodiments, the cross entropy between the attention distributions from the non-autoregressive ParaNet and a pretrained autoregressive model are minimized. The attention weights from the non-autoregressive ParaNet may be denoted as $W_{i,j}^{(k)}$, where i and j index the time-step of encoder and decoder respectively, and k refers to the k-th attention block within the decoder. Note that, the attention weights $\{W_{i,j}^{(k)}\}_{i=1}^{M}$ form a valid distribution. The attention loss may be computed as the average cross entropy between the student and teacher's attention distributions:

$$l_{atten} = -\frac{1}{KN}\sum_{k=1}^{K}\sum_{j=1}^{N}\sum_{i=1}^{M} W_{i,j}^{T}\log W_{i,j}^{(k)}, \quad (1)$$

where $W_{i,j}^{T}$ are the attention weights from the autoregressive teacher, M and N are the lengths of encoder and decoder, respectively. In one or more embodiments, the final loss function is a linear combination of $l_{atten}$ and $l_1$ losses from spectrogram predictions. In one or more embodiments, the coefficient of $l_{atten}$ as 4, and other coefficients as 1.

b) Positional Encoding Embodiments

In one or more embodiments, a positional encoding, such as in Deep Voice 3 embodiments, may be used at every attention block. The positional encoding may be added to both key and query vectors in the attention block, which forms an inductive bias for monotonic attention. Note that, the non-autoregressive model relies on its attention mechanism to decode mel spectrograms from the encoded textual features, without any autoregressive input. This makes the positional encoding even more important in guiding the attention to follow a monotonic progression over time at the beginning of training. The positional encodings $h_p(i)=\sin(\omega_s i/10000^{k/d})$ (for even i) or $\cos(\omega_s i/10000^{k/d})$ (for odd i), where i is the timestep index, k is the channel index, d is the total number of channels in the positional encoding, and $\omega_s$ is the position rate which indicates the average slope of the line in the attention distribution and roughly corresponds to the speed of speech. In one or more embodiments, $\omega_s$ may be set in the following ways:

For the autoregressive model, $\omega_s$ is set to one for the positional encoding of query. For the key, it is set to the averaged ratio of the time-steps of spectrograms to the time-steps of textual features, which is around 6.3 across the training dataset used herein. Taking into account that a reduction factor of 4 is used to simplify the learning of the attention mechanism, $\omega_s$ is simply set as 6.3/4 for the key at both training and synthesis.

For non-autoregressive ParaNet model embodiments, $\omega_s$ may also be set to one for the query, while $\omega_s$ for the key is calculated differently. At training, $\omega_s$ is set to the ratio of the lengths of spectrograms and text for each individual training instance, which is also divided by a reduction factor of 4. At synthesis, the length of output spectrogram and the corresponding $\omega_s$ should be specified, which controls the speech rate of the generated audios. For comparison, $\omega_s$ was set to be 6.3/4 as in autoregressive model, and the length of output spectrogram was set as 6.3/4 times the length of input text. Such a setup yields an initial attention in the form of a diagonal line and guides the non-autoregressive decoder to refine its attention layer by layer (see FIG. 10).

c) Attention Masking Embodiments

The non-autoregressive ParaNet embodiments at synthesis may use a different attention masking than was used in autoregressive DV3 embodiments. In one or more embodiments, for each query from the decoder, instead of computing the softmax over the entire set of encoder key vectors, in one or more embodiments, the softmax is computed over a fixed window centered around the target position and going forward and backward several timesteps (e.g., 3 timesteps). The target position may be calculated as $$\left\lfloor i_{query} \times \frac{4}{6.3} \right\rfloor,$$

where $i_{query}$ is the timestep index of the query vector, and $\lfloor \, \rfloor$ is the rounding operator. It was observed that this strategy reduces serious attention errors, such as repeating or skipping words, and also yields clearer pronunciations, thanks to its more condensed attention distribution. This attention masking may be shared across all attention blocks once it is generated, and it does not prevent the parallel synthesis of the non-autoregressive model.

D. WaveVAE Embodiments

Figure 11:
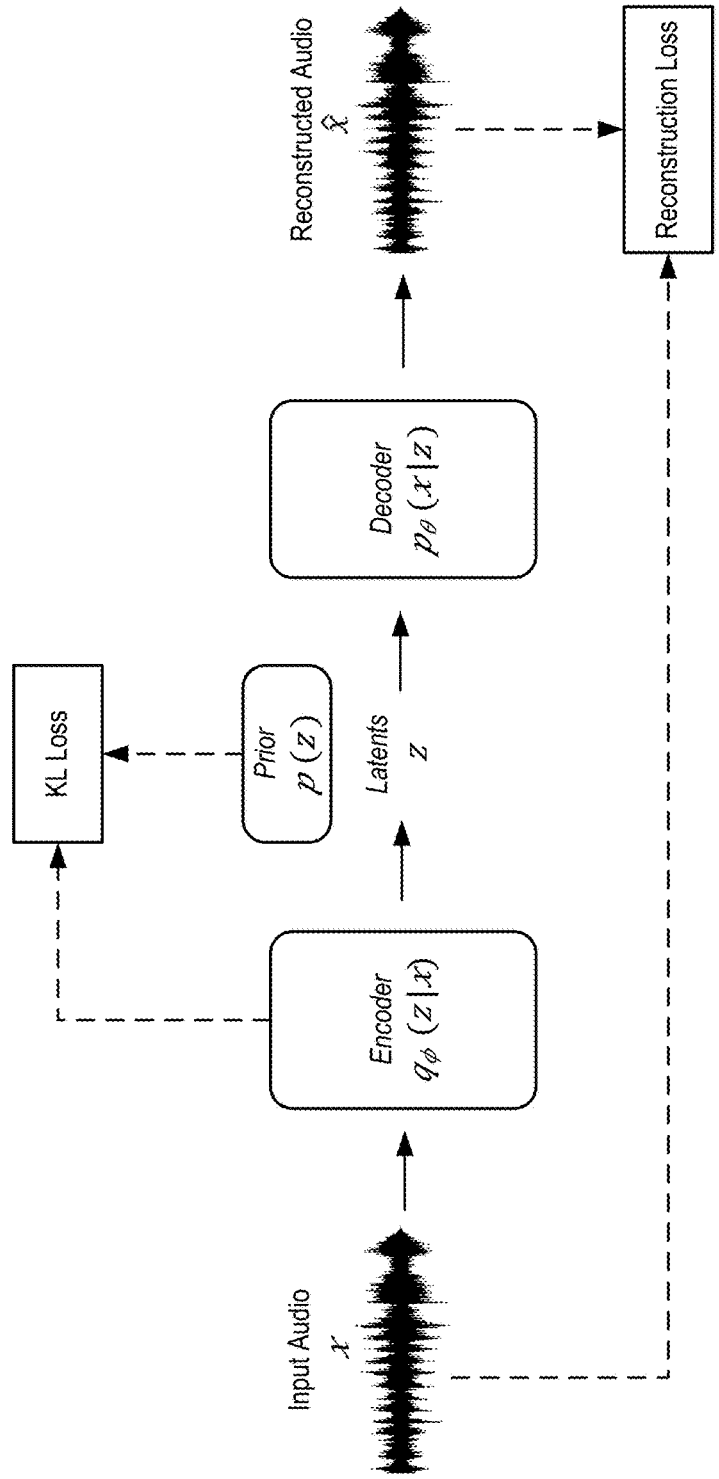
FIG. 11 depicts a simplified block diagram of a variational autoencoder (VAE) framework, according to embodiments of the present disclosure.

In one or more embodiments, the parallel neural TTS system feeds the predicted mel spectrogram from the non-autoregressive ParaNet model embodiment to the IAF-based parallel vocoder similar to ClariNet embodiments referenced above. In this section, an alternative embodiment for training the IAF as a generative model for raw waveform x is presented. In one or more embodiments, the method uses an auto-encoding variational Bayes/variational autoencoder (VAE) framework, thus it may be referred to for convenience as WaveVAE. In contrast to probability density distillation methods, WaveVAE embodiments may be trained from scratch by jointly optimizing the encoder $q_\phi(z|x, c)$ and decoder $p_\theta(x|z, c)$, where z is latent variables and c is the mel spectrogram conditioner. c is omitted for concise notation afterwards. FIG. 11 depicts a simplified block diagram of a variational autoencoder (VAE) framework, according to embodiments of the present disclosure.

1. Encoder Embodiments

In one or more embodiments, the encoder of WaveVAE $q_\phi(z|x)$ is parameterized by a Gaussian autoregressive WaveNet embodiment that maps the ground truth audio x into the same length latent representation z. Specifically, the Gaussian WaveNet embodiment models $x_t$ given the previous samples $x_{<t}$ as $x_t \sim \mathcal{N}(\mu(x_{<t}; \phi), \sigma(x_{<t}; \phi))$, where the mean $\mu(x_{<t}; \phi)$ and scale $\sigma(x_{<t}; \phi)$ are predicted by the WaveNet, respectively. The encoder posterior may be constructed as:

$$q_\phi(z|x) = \prod_t q_\phi(z_t | x_{\leq t}), \tag{2}$$

$$\text{where } q_\phi(z_t | x_{\leq t}) = \mathcal{N}\left(\frac{x_t - \mu(x_{<t}; \phi)}{\sigma(x_{<t}; \phi)}, \varepsilon\right).$$

Note that, the mean $\mu(x_{<t}; \phi)$ and scale $\sigma(x_{<t}; \phi)$ are applied for "whitening" the posterior distribution. In one or more embodiments, a trainable scalar $\varepsilon > 0$ to capture the global variation, which will ease the optimization process. Given the observed x, the $q_\phi(z|x)$ admits parallel sampling of latents z. One may build the connection between the encoder of WaveVAE and teacher model of a ClariNet embodiment, as both of them use a Gaussian WaveNet to guide the training of the inverse autoregressive flow (IAF) for parallel wave generation.

2. Decoder Embodiments

In one or more embodiment, the decoder $p_\theta(x|z)$ is an IAF. Let $z^{(0)} = z$ and apply a stack of IAF transformations from $z^{(0)} \to \ldots z^{(i)} \to \ldots z^{(n)}$ and each transformation $z^{(i)} = f(z^{(i-1)}; \theta)$ is defined as:

$$z^{(i)} = z^{(i-1)} \cdot \sigma^{(i)} + \mu^{(i)}, \tag{3}$$

where $\mu_t^{(i)} = \mu(z_{<t}^{(i-1)}; \theta)$ and $\sigma_t^{(i)} = \sigma(z_{<t}^{(i-1)}; \theta)$ are shifting and scaling variables modeled by a Gaussian WaveNet. As a result, given $z^{(0)} \sim \mathcal{N}(\mu^{(0)}, \sigma^{(0)})$ from the Gaussian prior or encoder, the per-step $p(z_t^{(n)} | z_{<t}^{(0)})$ also follows Gaussian with scale and mean as, $$\sigma^{tot} = \prod_{i=0}^b \sigma^{(i)}, \mu^{tot} = \sum_{i=0}^n \mu^{(i)} \prod_{j>i}^n \sigma^{(j)} \tag{4}$$

Lastly, x may be set as $x = \epsilon \cdot \sigma^{tot} + \mu^{tot}$, where $\epsilon \sim \mathcal{N}(0, I)$. Thus, $p_\theta(x|z) = \mathcal{N}(\mu^{tot}, \sigma^{tot})$. For the generative process, in one or more embodiments, the standard Gaussian prior $p(z) = \mathcal{N}(0, I)$ was used.

3. VAE Objective Embodiments

In one or more embodiments, the goal is to maximize the evidence lower bound (ELBO) for observed x in VAE:

$$\max_{\phi, \theta} \mathbb{E}_{q_\phi(z|x)}[\log p_\theta(x|z)] - KL(q_\phi(z|x) \| p(z)), \tag{5}$$

where the KL divergence can be calculated in closed-form as both $q_\phi(z|x)$ and $p(z)$ are Gaussians:

$$KL(q_\phi(z|x) \| p(z)) = \sum_t \log \frac{1}{\varepsilon} + \frac{1}{2}\left(\varepsilon^2 - 1 + \left(\frac{x_t - \mu(x_{<t})}{\sigma(x_{<t})}\right)^2\right). \tag{6}$$

The reconstruction term in Eq. (5) is intractable to compute exactly. In one or more embodiments, a stochastic optimization may be performed by drawing a sample z from the encoder $q_\phi(z|x)$ through reparameterization, and evaluating the likelihood $\log p_\theta(x|z)$. To avoid the "posterior collapse," in which the posterior distribution $q_\phi(z|x)$ quickly collapses to the white noise prior $p(z)$ at the early stage of training, in one or more embodiments, an annealing strategy for KL divergence was applied, where its weight is gradually increased from 0 to 1, via a sigmoid function. Through it, the encoder can encode sufficient information into the latent representations at the early training, and then gradually regularize the latent representation by increasing the weight of the KL divergence.

4. Short-Term Fourier Transform (STFT) Embodiments

Similar to ClariNet embodiments, a short-term Fourier transform (STFT) based loss may be added to improve the quality of synthesized speech. In one or more embodiments, the STFT loss may be defined as the summation of $l_2$ loss on the magnitudes of STFT and $l_1$ loss on the log-magnitudes of STFT between the output audio and ground truth audio. In one or more embodiments, for STFT, a 12.5 millisecond (ms) frame-shift, 50 ms Hanning window length, and the FFT size was set to 2048. The two STFT losses were considered in the objective: (i) the STFT loss between ground truth audio and reconstructed audio using encoder $q_\phi(z|x)$; and (ii) the STFT loss between ground truth audio and synthesized audio using the prior $p(z)$, with the purpose of reducing the gap between reconstruction and synthesis. In one or more embodiments, the final loss is a linear combination of the terms in Eq. (5) and the STFT losses. The corresponding coefficients are simply set to be one in experiments herein.

E. Example Implementation Methodology

FIG. 12 depicts a general method for using a ParaNet embodiment for synthesizing a speech representation from input text, according to embodiments of the present disclosure. As illustrated in FIG. 12, a computer-implemented method for synthesizing speech from an input comprises encoding (1205) the input text into hidden representations comprising a set of key representations and a set of value representations using the encoder, which comprises one or more convolution layers. In one or more embodiments, the hidden representations are used (1210) by a non-autoregressive decoder to obtain a synthesized representation, which may be a linear spectrogram output, a mel spectrogram output, or a waveform. In one or more embodiments, the non-autoregressive decoder comprises an attention block that uses positional encoding and the set of key representations to generate a context representation for each time step, which context representations are supplied as inputs to a first decoder block in a plurality of decoder blocks. In one or more embodiments, the positional encoding is used by the attention block to affect attention alignment weighting.

In one or more embodiments, a decoder block comprises: a non-casual convolution block, which receives as an input the context representation if it is the first decoder block in the plurality of decoder blocks and receives as an input a decoder block output from a prior decoder block if it is the second or subsequent decoder block in the plurality of decoder blocks and outputs a decoder block output comprising a query and an intermediary output; and an attention block, which uses the query output from the non-casual convolution block and positional encoding to compute a context representation that is combined with the intermediary output to create a decoder block output for the decode block.

In one or more embodiments, the set of decoder block outputs are used (1215) to generate a set of audio representation frames representing the input text. The set of audio representation frames may be linear spectrograms, mel spectrograms, or a waveform. In embodiments in which the output is a waveform, obtaining the waveform may involve using a vocoder. In one or more embodiments, the TTS system may comprise a vocoder, such as an the IAF-based parallel vocoder, that converts the set of audio representation frames into a signal representing synthesized speech of the input text. As noted above, the IAF-based parallel vocoder may be a WaveVAE embodiment that is trained without distillation. For example, in one or more embodiments, the vocoder decoder may be trained without distillation by using the encoder of the vocoder to guide training of the vocoder decoder. A benefit of such a methodology is that the encoder can be jointly trained with the vocoder decoder.

F. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

In this section, several experiments that evaluate embodiments are presented. In experiments, an internal English speech dataset containing about 20 hours of speech data from a female speaker with a sampling rate of 48 kHz was used. The audios were downsampled to 24 kHz.

1. IAF-Based Waveform Synthesis

First, two training method embodiments, a ClariNet embodiment and a WaveVAE embodiment, for IAF-based waveform synthesis. The same IAF architecture as described in the ClariNet patent application, which was incorporated by referenced above, was used. It comprises four stacked Gaussian IAF blocks, which are parameterized by [10, 10, 10, 30]-layer WaveNets respectively, with the 64 residual & skip channels and filter size 3 in dilated convolutions. The IAF is conditioned on log-mel spectrograms with two layers of transposed 2-D convolution as in the ClariNet embodiment. The same teacher-student setup for ClariNet and a 20-layer Gaussian autoregressive WaveNet was trained as the teacher model. For the encoder in WaveVAE, a 20-layers Gaussian WaveNet conditioned on log-mel spectrograms was used. Note that, in the tested embodiments, both the encoder and decoder of WaveVAE shared the same conditioner network. Adam optimizer with 1000K steps was used for both methods. The learning rate was set to 0.001 in the beginning and annealed by half for every 200K steps.

The crowdMOS toolkit (developed by F. Ribeiro, D. Florêncio, C. Zhang, and M. Seltzer in "CrowdMOS: An approach for crowdsourcing mean opinion score studies," in ICASSP, 2011) was used for subjective Mean Opinion Score (MOS) evaluation, where batches of samples from these models were presented to workers on Mechanical Turk. The MOS results are presented in Table 2. Although the WaveVAE (prior) model performs worse than ClariNet at synthesis, it is trained from scratch and does not require any pre-training. In one or more embodiments, further improvement of WaveVAE may be achieved by introducing a learned prior network, which will minimize the quality gap between the reconstructed speech with encoder and synthesized speech with prior.

TABLE 2

Mean Opinion Score (MOS) ratings with 95% confidence intervals for waveform synthesis. We use the same Gaussian IAF architecture for ClariNet and WaveVAE. Note that, WaveVAE (recons.) refers to reconstructed speech by using latents from the encoder.

| Neural Vocoder | Subjective 5-scale MOS |
|---|---|
| WaveNet | 4.40 ± 0.21 |
| ClariNet | 4.21 ± 0.18 |
| WaveVAE (recons.) | 4.37 ± 0.23 |
| WaveVAE (prior) | 4.02 ± 0.24 |
| Ground-truth (24 kHz) | 4.51 ± 0.16 |

2. Text-to-Speech

An embodiment of the text-to-spectrogram ParaNet model and the parallel neural TTS system with IAF-based vocoders, including ClariNet and WaveVAE, were evaluated. The mixed representation of characters and phonemes introduced in the DV3 patent application was used. All hyperparameters of autoregressive and non-autoregressive ParaNet embodiments are shown in Table 3, below. It was found that larger kernel width and deeper layers generally helped to improve the speech quality. The tested non-autoregressive model was ~2.57 times larger than the autoregressive model in terms of the number of parameters, but it obtained significant speedup at synthesis.

TABLE 3

Hyperparameters of the autoregressive seq2seq model and non-autoregressive seq2seq model embodiments tested in the experiments.

| Hyperparameter | Autoregressive Model | Non-autoregressive Model |
|---|---|---|
| FFT Size | 2048 | 2048 |
| FFT Window Size/Shift | 1200/300 | 1200/300 |
| Audio Sample Rate | 24000 | 24000 |
| Reduction Factor r | 4 | 4 |
| Mel Bands | 80 | 80 |
| Character Embedding Dim. | 256 | 256 |
| Encoder Layers/Conv. Width/Channels | 7/5/64 | 7/9/64 |
| Decoder PreNet Affine Size | 128,256 | N/A |
| Decoder Layers/Conv. Width | 4/5 | 17/7 |
| Attention Hidden Size | 128 | 128 |
| Position Weight/Initial Rate | 1.0/6.3 | 1.0/6.3 |
| PostNet Layers/Conv. Width/Channels | 5/5/256 | N/A |
| Dropout Keep Probability | 0.95 | 1.0 |
| ADAM Learning Rate | 0.001 | 0.001 |
| Batch Size | 16 | 16 |
| Max Gradient Norm | 100 | 100 |
| Gradient Clipping Max. Value | 5.0 | 5.0 |
| Total Number of Parameters | 6.85M | 17.61M | a) Speedup at Synthesis

A non-autoregressive ParaNet embodiment was compared with an autoregressive DV3 embodiment in terms of inference latency. A custom sentence test set was constructed and run inference for 50 runs on each of the sentences in the test set (batch size is set to 1). The average inference latencies over 50 runs and sentence test set are 0.024 and 1.12 seconds on NVIDIA GeForce GTX 1080 Ti produced by Nvidia of Santa Clara, Calif., for the non-autoregressive and autoregressive model embodiments, respectively. Hence, the ParaNet embodiment yielded about 46.7 times speed-up compared to its autoregressive counterpart at synthesis.

b) Attention Error Analysis

In autoregressive models, there tends to be a noticeable discrepancy between the teacher-forced training and autoregressive inference, which can yield accumulated errors along the generated sequence at synthesis. In neural TTS systems, this discrepancy leads to miserable attention errors at autoregressive inference, including (i) repeated words, (ii) mispronunciations, and (iii) skipped words, which can be a critical problem for online deployment of attention-based neural TTS systems. An attention error analysis was performed for the non-autoregressive ParaNet model embodiment on a 100-sentence test set, which includes particularly challenging cases from deployed TTS systems (e.g., dates, acronyms, URLs, repeated words, proper nouns, foreign words, etc.).

As illustrated in Table 4, it was found that the non-autoregressive ParaNet embodiment has much fewer attention errors than its autoregressive counterpart at synthesis (12 vs. 37). Although the ParaNet embodiment distills the (teacher-forced) attentions from an autoregressive model, it only takes textual inputs at both training and synthesis and does not have the similar discrepancy as in an autoregressive model. Previously, attention masking was applied to enforce the monotonic attentions and reduce attention errors, and it was demonstrated to be effective in Deep Voice 3 embodiments. It was found that the tested non-autoregressive ParaNet embodiment still had fewer attention errors than the tested autoregressive DV3 embodiment (6 vs. 8 in Table 4), when both of them were using the attention masking techniques.

TABLE 4

Attention error counts for text-to-spectrogram models on the 100-sentence test set. One or more mispronunciations, skips, and repeats count as a single mistake per utterance. All models use Griffin-Lim as vocoder for convenience. The non-autoregressive ParaNet with attention mask embodiment obtained the fewest attention errors in total at synthesis.

| Model Embodiment | Attention mask at inference | Repeat | Mispronounce | Skip | Total |
|---|---|---|---|---|---|
| Deep Voice 3 | No | 12 | 10 | 15 | 37 |
| Deep Voice 3 | Yes | 1 | 4 | 3 | 8 |
| ParaNet | No | 1 | 4 | 7 | 12 |
| ParaNet | Yes | 2 | 4 | 0 | 6 | c) MOS Evaluation

The MOS evaluation results of the TTS system embodiments are reported in Table 5. Experiments were conducted by pairing autoregressive and non-autoregressive text-to-spectrogram models with different neural vocoders. The WaveNet vocoders were trained on predicted mel spectrograms from DV3 and non-autoregressive model embodiments for better quality, respectively. Both the ClariNet vocoder embodiment and the WaveVAE embodiment were trained on ground-truth mel spectrograms for stable optimization. At synthesis, all of them were conditioned on the predicted mel spectrograms from the text-to-spectrogram model embodiment. Note that the non-autoregressive ParaNet embodiment can provide comparable quality of speech as the autoregressive DV3 with WaveNet vocoder embodiment. When the parallel neural vocoder was applied, the qualities of speech degenerate, partly because the mismatch between the ground truth mel spectrogram used for training and predicted mel spectrogram for synthesis. Further improvement may be achieved by successfully training IAF-based neural vocoders on predicted mel spectrogram.

TABLE 5

Mean Opinion Score (MOS) ratings with 95% confidence intervals for comparison. The crowdMOS toolkit, as in Table 2, was used.

| Neural TTS System Embodiments | MOS score |
|---|---|
| Deep Voice 3 + WaveNet (predicted Mel) | 4.09 ± 0.26 |
| Deep Voice 3 + ClariNet (true Mel) | 3.93 ± 0.27 |
| Deep Voice 3 + WaveVAE (true Mel) | 3.70 ± 0.29 |
| ParaNet + WaveNet (predicted Mel) | 4.01 ± 0.24 |
| ParaNet + ClariNet (true Mel) | 3.52 ± 0.28 |
| ParaNet + WaveVAE (true Mel) | 3.25 ± 0.34 |

G. Some Conclusions

Presented herein were embodiments of a fully parallel neural text-to-speech system comprising a non-autoregressive text-to-spectrogram model and applying IAF-based parallel vocoders. Embodiments of the novel non-autoregressive system (which may be generally referred to for convenience as ParaNet) have fewer attention errors. A test embodiment obtained 46.7 times speed-up over its autoregressive counterpart at synthesis without minor degeneration of speech quality. In addition, embodiments of an alternative vocoder (which may be generally referred to as WaveVAE) was developed to train inverse autoregressive flow (IAF) for parallel waveform synthesis. WaveVAE embodiments avoid the need for distillation from a separately trained autoregressive WaveNet and can be trained from scratch.

H. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 13:
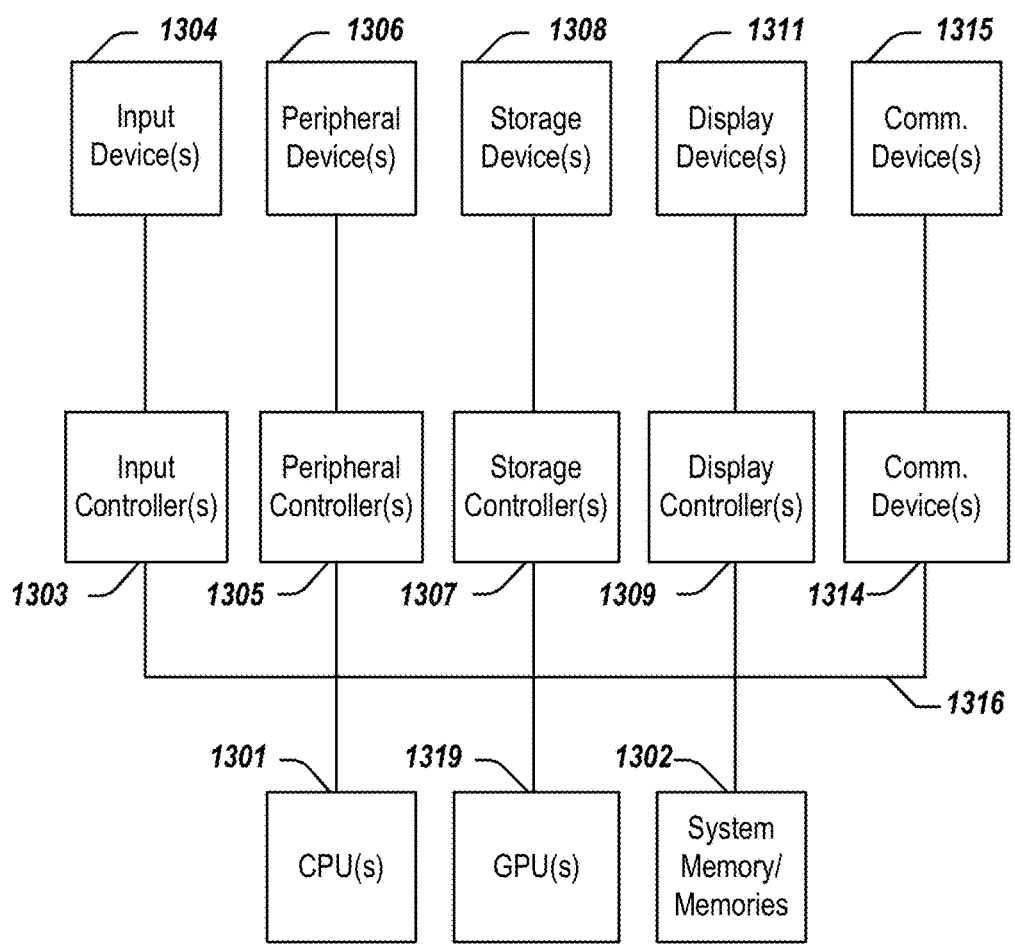
FIG. 13 depicts a simplified block diagram of a computing device/information handling system, according to embodiments of the present disclosure.

FIG. 13 depicts a simplified block diagram of a computing device/information handling system (or computing system) according to embodiments of the present disclosure. It will be understood that the functionalities shown for system 1300 may operate to support various embodiments of a computing system—although it shall be understood that a computing system may be differently configured and include different components, including having fewer or more components as depicted in FIG. 13.

As illustrated in FIG. 13, the computing system 1300 includes one or more central processing units (CPU) 1301 that provides computing resources and controls the computer. CPU 1301 may be implemented with a microprocessor or the like, and may also include one or more graphics processing units (GPU) 1319 and/or a floating-point coprocessor for mathematical computations. System 1300 may also include a system memory 1302, which may be in the form of random-access memory (RAM), read-only memory (ROM), or both.

A number of controllers and peripheral devices may also be provided, as shown in FIG. 13. An input controller 1303 represents an interface to various input device(s) 1304, such as a keyboard, mouse, touchscreen, and/or stylus. The computing system 1300 may also include a storage controller 1307 for interfacing with one or more storage devices 1308 each of which includes a storage medium such as magnetic tape or disk, or an optical medium that might be used to record programs of instructions for operating systems, utilities, and applications, which may include embodiments of programs that implement various aspects of the present disclosure. Storage device(s) 1308 may also be used to store processed data or data to be processed in accordance with the disclosure. The system 1300 may also include a display controller 1309 for providing an interface to a display device 1311, which may be a cathode ray tube (CRT), a thin film transistor (TFT) display, organic light-emitting diode, electroluminescent panel, plasma panel, or other type of display. The computing system 1300 may also include one or more peripheral controllers or interfaces 1305 for one or more peripherals 1306. Examples of peripherals may include one or more printers, scanners, input devices, output devices, sensors, and the like. A communications controller 1314 may interface with one or more communication devices 1315, which enables the system 1300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media may include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for synthesizing speech from an input text using a text-to-speech (TTS) system comprising an encoder and a non-autoregressive decoder, the method comprising:

encoding the input text into hidden representations comprising a set of key representations and a set of value representations using the encoder, which comprises one or more convolution layers, of the TTS system;

decoding the hidden representations using the non-autoregressive decoder of the TTS system, the non-autoregressive decoder comprising:

an attention block that uses positional encoding and the set of key representations to generate a context representation for each time step, which context representations are supplied as inputs to a first decoder block in a plurality of decoder blocks; and the plurality of decoder blocks, in which a decoder block comprising:

a non-casual convolution block, which receives as an input the context representation if it is the first decoder block in the plurality of decoder blocks and receives as an input a decoder block output from a prior decoder block if it is the second or subsequent decoder block in the plurality of decoder blocks and outputs a decoder block output comprising a query and an intermediary output; and an attention block, which uses the query output from the non-casual convolution block and positional encoding to compute a context representation that is combined with the intermediary output to create a decoder block output for the decode block; and using a set of decoder block outputs to generate a set of audio representation frames representing the input text.

2. The computer-implemented method of claim 1 wherein the attention blocks of the plurality of decoder blocks compute a context representation by performing the steps comprising:

using a per-time-step query from the non-casual convolution block of the decoder block and a per-time-step key representation from the encoder to compute attention weights; and obtaining the context representation as a weighted average of one or more value representations from the encoder.

3. The computer-implemented method of claim 1 wherein the attention blocks of the plurality of decoder blocks comprise an attention masking layer that performs the step comprising:

for a query from the non-casual convolution block, computing a softmax of attention weights over a fixed window centered around a target position, in which the target position is calculated as related to a time-step index of the query.

4. The computer-implemented method of claim 1 wherein the positional encoding is used by the attention block to affect attention alignment weighting.

5. The computer-implemented method of claim 1 wherein the TTS system further comprises a vocoder and the method further comprises:

using the vocoder to convert the set of audio representation frames into a signal representing synthesized speech of the input text.

6. The computer-implemented method of claim 5 wherein the vocoder comprises a vocoder decoder comprising an inverse autoregressive flow (IAF) that was trained without distillation.

7. The computer-implemented method of claim 6 wherein the step of training the vocoder decoder without distillation comprises:

using an encoder of the vocoder to guide training of the vocoder decoder and the encoder is jointly trained with the vocoder decoder.

8. The computer-implemented method of claim 5 further comprising:

implementing the TTS system fully in parallel.

9. A non-transitory computer-readable medium or media comprising one or more sequences of instructions which, when executed by one or more processors, causes steps to be performed comprising:

encoding an input text into hidden representations comprising a set of key representations and a set of value representations using an encoder, which comprises one or more convolution layers, of a text-to-speech (TTS) system;

decoding the hidden representations using a non-autoregressive decoder of the TTS system, the non-autoregressive decoder comprising:

an attention block that uses positional encoding and the set of key representations to generate a context representation for each time step, which context representations are supplied as inputs to a first decoder block in a plurality of decoder blocks; and the plurality of decoder blocks, in which a decoder block comprising:

a non-casual convolution block, which receives as an input the context representation if it is the first decoder block in the plurality of decoder blocks and receives as an input a decoder block output from a prior decoder block if it is the second or subsequent decoder block in the plurality of decoder blocks and outputs a decoder block output comprising a query and an intermediary output; and an attention block, which uses the query output from the non-casual convolution block and positional encoding to compute a context representation that is combined with the intermediary output to create a decoder block output for the decode block; and using a set of decoder block outputs to generate a set of audio representation frames representing the input text.

10. The non-transitory computer-readable medium or media of claim 9 wherein the attention blocks of the plurality of decoder blocks compute a context representation by performing the steps comprising:

using a per-time-step query from the non-casual convolution block of the decoder block and a per-time-step key representation from the encoder to compute attention weights; and obtaining the context representation as a weighted average of one or more value representations from the encoder.

11. The non-transitory computer-readable medium or media of claim 9 wherein the attention blocks of the plurality of decoder blocks comprise an attention masking layer that performs the step comprising:

for a query from the non-casual convolution block, computing a softmax of attention weights over a fixed window centered around a target position, in which the target position is calculated as related to a time-step index of the query.

12. The non-transitory computer-readable medium or media of claim 9 further comprising one or more sequences of instructions which, when executed by one or more processors, causes steps to be performed comprising:

using a vocoder to convert the set of audio representation frames into a signal representing synthesized speech of the input text.

13. The non-transitory computer-readable medium or media of claim 12 wherein the vocoder comprises a vocoder decoder comprising an inverse autoregressive flow (IAF) that was trained without distillation.

14. The non-transitory computer-readable medium or media of claim 13 wherein the step of training the vocoder decoder without distillation comprises:

using an encoder of the vocoder to guide training of the vocoder decoder and the encoder is jointly trained with the vocoder decoder.

15. A system comprising:

one or more processors; and a non-transitory computer-readable medium or media comprising one or more sets of instructions which, when executed by one or more processors, causes steps to be performed comprising:

encoding an input text into hidden representations comprising a set of key representations and a set of value representations using an encoder, which comprises one or more convolution layers, of a text-to-speech (TTS) system;

decoding the hidden representations using a non-autoregressive decoder of the TTS system, the non-autoregressive decoder comprising:

an attention block that uses positional encoding and the set of key representations to generate a context representation for each time step, which context representations are supplied as inputs to a first decoder block in a plurality of decoder blocks; and the plurality of decoder blocks, in which a decoder block comprising:

a non-casual convolution block, which receives as an input the context representation if it is the first decoder block in the plurality of decoder blocks and receives as an input a decoder block output from a prior decoder block if it is the second or subsequent decoder block in the plurality of decoder blocks and outputs a decoder block output comprising a query and an intermediary output; and an attention block, which uses the query output from the non-casual convolution block and positional encoding to compute a context representation that is combined with the intermediary output to create a decoder block output for the decode block; and using a set of decoder block outputs to generate a set of audio representation frames representing the input text.

16. The system of claim 15 wherein the attention blocks of the plurality of decoder blocks compute a context representation by performing the step comprising:

using a per-time-step query from the non-casual convolution block of the decoder block and a per-time-step key representation from the encoder to compute attention weights; and obtaining the context representation as a weighted average of one or more value representations from the encoder.

17. The system of claim 15 wherein the attention blocks of the plurality of decoder blocks comprise an attention masking layer that performs the step comprising:

for a query from the non-casual convolution block, computing a softmax of attention weights over a fixed window centered around a target position, in which the target position is calculated as related to a time-step index of the query.

18. The system of claim 15 wherein the TTS system further comprises a vocoder and wherein the non-transitory computer-readable medium or media further comprises one or more sequences of instructions which, when executed by one or more processors, causes steps to be performed comprising:

using a vocoder to convert the set of audio representation frames into a signal representing synthesized speech of the input text.

19. The system of claim 18 wherein the vocoder comprises a vocoder decoder comprising an inverse autoregressive flow (IAF) that was trained without distillation by using an encoder of the vocoder to guide training of the vocoder decoder and the encoder is jointly trained with the vocoder decoder.

20. The system of claim 18 further comprising:
executing the TTS system fully in parallel.

* * * * *